United States Patent
Nakamura et al.

(10) Patent No.: US 11,572,630 B2
(45) Date of Patent: Feb. 7, 2023

(54) METHOD AND APPARATUS FOR WATER ELECTROLYSIS, AND METHOD FOR DETERMINING DRIVE POTENTIAL OF WATER ELECTROLYSIS

(71) Applicant: RIKEN, Wako (JP)

(72) Inventors: Ryuhei Nakamura, Wako (JP); Hideshi Ooka, Wako (JP); Nadege Bonnet, Wako (JP); Ailong Li, Wako (JP); Shuang Kong, Wako (JP); Hongxian Han, Wako (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 17/266,700

(22) PCT Filed: Aug. 9, 2019

(86) PCT No.: PCT/JP2019/031640
§ 371 (c)(1),
(2) Date: Apr. 1, 2021

(87) PCT Pub. No.: WO2020/032256
PCT Pub. Date: Feb. 13, 2020

(65) Prior Publication Data
US 2021/0301406 A1    Sep. 30, 2021

Related U.S. Application Data

(60) Provisional application No. 62/716,632, filed on Aug. 9, 2018.

(51) Int. Cl.
C25B 1/04       (2021.01)
C25B 1/50       (2021.01)
(Continued)

(52) U.S. Cl.
CPC .......... *C25B 1/04* (2013.01); *C25B 1/50* (2021.01); *C25B 9/23* (2021.01); *C25B 11/077* (2021.01);
(Continued)

(58) Field of Classification Search
CPC ................ C25B 1/04; C25B 11/079
See application file for complete search history.

(56) References Cited

U.S. PATENT DOCUMENTS 4,289,591 A * 9/1981 Davidson .......... C25B 11/093
                                                   205/634
2020/0362468 A1* 11/2020 Bonakdarpour .......... C25B 1/21

FOREIGN PATENT DOCUMENTS

CN    105396599 A    3/2016
JP    57-500513 A    3/1982
(Continued)

OTHER PUBLICATIONS

Huyhn et al "Nature of Activated Manganese Oxide for Oxygen Evolution" JACS, 2015, 137, 14887-14904 (Year: 2015).*
(Continued)

*Primary Examiner* — Brian W Cohen
(74) *Attorney, Agent, or Firm* — Sughrue Mion, PLLC

(57) ABSTRACT

The present invention provides a water electrolysis method comprising: supplying at least water into an electrolysis cell which includes a solid polymer electrolyte membrane, and an anode and a cathode disposed sandwiching the solid polymer electrolyte membrane therebetween; and providing a potential P between the anode and the cathode to generate oxygen from the anode, wherein an oxidation catalyst containing at least one of first transition metals is present on at least a part of a surface of the anode, and the potential P satisfies P1<P<P2, wherein P1 indicates a lowest potential at which oxygen is generated from the anode, and P2 indicates
(Continued)

a lowest potential P2 at which a quantitative index of a dissolved chemical species derived from the oxidation catalyst begins to show potential dependence.

6 Claims, 19 Drawing Sheets

(51) Int. Cl.
    *C25B 11/077*     (2021.01)
    *C25B 9/23*     (2021.01)
    *C25B 15/029*     (2021.01)
    *C25B 13/08*     (2006.01)
    *C25B 15/02*     (2021.01)

(52) U.S. Cl.
    CPC .............. *C25B 13/08* (2013.01); *C25B 15/02* (2013.01); *C25B 15/029* (2021.01)

(56) References Cited

FOREIGN PATENT DOCUMENTS

JP      2003-166093 A      6/2003
JP      2015-148010 A      8/2015

OTHER PUBLICATIONS

Supporting information of Huyhn et al. "Nature of Activated Manganese Oxide for Oxygen Evolution" JACS, 2015, 137, 14887-14904 (Year: 2015).*

Kyoungsuk Jin et al., "Mechanistic Investigation of Water Oxidation Catalyzed by Uniform, Assembled MnO Nanoparticles", Journal of the American Chemical Society, 2017, p. 2277-2285, vol. 139, No. 6.

Charles C. L. McCrory et al., "Benchmarking Hydrogen Evolving Reaction and Oxygen Evolving Reaction Electrocatalysts for Solar Water Splitting Devices", Journal of the American Chemical Society, 2015, 137, p. 4347-4357.

Marcel Pourbaix, "Atlas of Electrochemical Equilibria in Aqueous Solutions", Pergamon, New York, 1966, p. 286-292.

Ivan A. Moreno-Hernandez et al., "Crystalline nickel manganese antimonate as a stable water-oxidation catalyst in aqueous 1.0 M H2SO4", Energy Environ. Sci., 2017, vol. 10, pp. 2103-2108.

Jared S. Mondschein et al., "Crystalline Cobalt Oxide Films for Sustained Electrocatalytic Oxygen Evolution under Strongly Acidic Conditions", Chem. Mater., 2017, vol. 29, pp. 950-957.

Rasmus Frydendal et al., "Toward an Active and Stable Catalyst for Oxygen Evolution in Acidic Media: Ti-Stabilized MnO2", Advanced Energy Materials, 2015, vol. 5, 1500991, 9 pages.

Michael Huynh et al., "Design of template-stabilized active and earth-abundant oxygen evolution catalysts in acid", Chem. Sci., 2017, vol. 8, p. 4779-4794.

J. K. Norskov et al., "Towards the computational design of solid catalysts", Nature Chemistry, Apr. 2019, p. 37-46, vol. 1.

International Search Report for PCT/JP2019/031640 dated Oct. 29, 2019 [PCT/ISA/210].

Written Opinion of the International Searching Authority for PCT/JP2019/031640 dated Oct. 29, 2019 [PCT/ISA/237].

* cited by examiner

METHOD AND APPARATUS FOR WATER ELECTROLYSIS, AND METHOD FOR DETERMINING DRIVE POTENTIAL OF WATER ELECTROLYSIS

CROSS REFERENCE TO RELATED APPLICATIONS

This application is a National Stage of International Application No. PCT/JP2019/031640 filed Aug. 9, 2019, claiming priority based on US Provisional Patent Application No. 62/716,632 filed Aug. 9, 2018.

TECHNICAL FIELD

The present invention relates to a water electrolysis method and a water electrolysis apparatus. The present invention also relates to a method for determining a drive potential in water electrolysis.

BACKGROUND ART

The development of efficient technologies that utilize renewable energy is important to meet the growing energy demand. Hydrogen produced by water electrolysis ($2H_2O \rightarrow 2H_2+O_2$) is not only an ideal energy support for storing renewable energy, but also an important raw material in the chemical industry such as ammonia synthesis.

A particularly promising mechanism for water electrolysis is a proton-exchange membrane (PEM) electrolyzer. However, a PEM locally brings about an acidic environment. Therefore, the catalysts that maintain stable catalytic activity against oxygen evolution reaction (OER; $2H_2O \rightarrow O_2+4H^++4e^-$) are oxide derivatives of iridium, which is one of the rarest elements in the earth's crust. For example, the use of a terawatt-scale PEM electrolyzer with an iridium oxide catalyst would require more than 10 times the annual iridium production. Considering this, it can be said that the development of an acid-stable non-noble metal OER catalyst is an important issue in water electrolysis with a PEM electrolyzer.

Extensive research has been conducted to develop 3d transition metal-based OER catalysts that can be used over a wide pH range. However, many experimental studies have shown that oxides of abundant metals (iron, cobalt, nickel, manganese) are unstable due to their solubility in acidic media (NPLs 1 to 6). Their lack of stability is a particularly urgent issue, as there is currently no general way to reasonably identify stable materials. On the other hand, it has been proved that the activity of a 3d transition metal (first transition metal) catalyst can be predicted and selected by the d-band theory (NPL 7).

CITATION LIST

Non Patent Literature

[NPL 1] C. C. McCrory, S. Jung, I. M. Ferrer, S. M. Chatman, J. C. Peters, T. F. Jaramillo, J. Am. Chem. Soc. 2015, 137, 4347-4357

[NPL 2] M. Pourbaix, Atlas of electrochemical equilibria in aqueous solutions, Pergamon, New York, 1966, pp. 286-292

[NPL 3] I. A. Moreno-Hernandez, C. A. MacFarland, C. G. Read, K. M. Papadantonakis, B. S. Brunschwig, N. S. Lewis, Energy Environ. Sci. 2017, 10, 2103-2108

[NPL 4] J. S. Mondschein, J. F. Callejas, C. G. Read, J. Y. C. Chen, C. F. Holder, C. K. Badding, R. E. Schaak, Chem. Mater. 2017, 29, 950-957

[NPL 5] R. Frydendal, E. A. Paoli, I. Chorkendorff, J. Rossmeisl, I. E. L. Stephens, Adv. Energy Mater. 2015, 5, 1500991

[NPL 6] M. Huynh, T. Ozel, C. Liu, E. C. Lau, D. G. Nocera, Chem. Sci. 2017, 8, 4779-4794

[NPL 7] J. K. Norskov, T. Bligaard, J. Rossmeisl, C. H. Christensen, Nat. Chem. 2009, 1, 37-46

SUMMARY OF INVENTION

Technical Problem

The present invention has been made in view of the problems of the related art, and an object thereof is to provide a method in which an oxidation catalyst containing a 3d transition metal (first transition metal) enables stable electrolysis of water.

Solution to Problem

The present inventors have conducted intensive studies to achieve the above object. As a result, it has been found that there is a potential window having a stable drive potential that can efficiently promote OER with an oxide of a first transition metal or the like and at the same time suppress the deactivation path of a catalyst such as the metal oxide. Thus, the present invention has been completed.

Specifically, the present invention relates to a method and an apparatus that enable an oxidation catalyst containing a first transition metal to stably electrolyze water. In addition, the present invention relates to a method for determining the drive potential which enables the oxidation catalyst containing the first transition metal to stably electrolyze water, which is more specifically as follows.

<1> A water electrolysis method comprising: supplying at least water into an electrolysis cell which includes a solid polymer electrolyte membrane, and an anode and a cathode disposed sandwiching the solid polymer electrolyte membrane therebetween; and providing a potential P between the anode and the cathode to generate oxygen from the anode, wherein an oxidation catalyst containing at least one of first transition metals (which is, for example, an oxide or hydroxide of a first transition metal, may be an oxide or hydroxide of a single first transition metal or may be a composite oxide or composite hydroxide of two or more first transition metals, or is preferably an oxide of a single first transition metal or a composite oxide of two or more first transition metals) is present on at least a part of a surface of the anode, and the potential P satisfies P1<P<P2, wherein P1 indicates a lowest potential at which oxygen is generated from the anode, and P2 indicates a lowest potential P2 at which a quantitative index of a dissolved chemical species derived from the oxidation catalyst begins to show potential dependence.

<2> The method according to <1>, further comprising: measuring P1 and P2 in advance.

<3> A method for determining a drive potential P of an electrolytic cell for water electrolysis including a solid polymer electrolyte membrane, an anode having an oxidation catalyst containing at least one of first transition metals, and a cathode, comprising: predetermining a lowest potential P1 between the anode and the cathode at which oxygen begins to be generated from the anode; predetermining a lowest potential P2 between the anode and the cathode at which a quantitative index of a dissolved chemical species derived from the oxidation catalyst begins to show potential dependence; and determining the drive potential P to a value satisfying a condition P1<P<P2.

<4> A method for determining a drive potential P of an electrolytic cell for water electrolysis including a solid polymer electrolyte membrane, an anode having an oxidation catalyst containing at least one of first transition metals (which is, for example, an oxide or hydroxide of a first transition metal, may be an oxide or hydroxide of a single first transition metal or may be a composite oxide or composite hydroxide of two or more first transition metals, or is preferably an oxide of a single first transition metal or a composite oxide of two or more first transition metals), and a cathode, comprising: obtaining a first curve formed by plotting the amount of oxygen evolution from the anode against a potential between the anode and the cathode; obtaining a second curve formed by plotting a quantitative index of a dissolved chemical species derived from the oxidation catalyst against the potential between the anode and the cathode; and determining the drive potential P based on a comparison between the first curve and the second curve.

<5> The method according to any one of <1> to <4>, wherein the quantitative index is an intensity I of an absorption peak attributed to the chemical species.

<6> The method according to any one of <1> to <4>, wherein the first transition metal is at least one metal selected from manganese, iron, cobalt, and nickel.

<7> The method according to any one of <1> to <4>, wherein the oxidation catalyst is an oxide or hydroxide of at least one selected from the first transition metals.

<8> The method according to any one of <1> to <4>, wherein the oxidation catalyst is at least one metal oxide or metal hydroxide selected from manganese oxide (2+, 3+, 4+), iron oxide (2+, 3+), cobalt hydroxide (2+, 3+), and nickel oxide (2+, 3+, 4+).

<9> The method according to any one of <1> to <4>, wherein the oxidation catalyst is manganese oxide, and P satisfies 1.65 V<P<1.75 V with respect to a hydrogen electrode (RHE).

<10> A water electrolysis apparatus comprising: a solid polymer electrolytic membrane; an anode and a cathode disposed sandwiching the solid polymer electrolytic membrane; a power supply unit for applying a potential between the anode and the cathode; and a control unit that controls the potential to P satisfying P1<P<P2, wherein an oxidation catalyst containing at least one of first transition metals (which is, for example, an oxide or hydroxide of a first transition metal, may be an oxide or hydroxide of a single first transition metal or may be a composite oxide or composite hydroxide of two or more first transition metals, or is preferably an oxide of a single first transition metal or a composite oxide of two or more first transition metals) is present on at least a part of a surface of the anode, P1 is a lowest potential at which oxygen is generated from the anode, and P2 indicates a lowest potential P2 at which a quantitative index of a dissolved chemical species derived from the oxidation catalyst begins to show potential dependence.

<11> The apparatus according to <10>, wherein P1 and P2 are pre-input values.

<12> The apparatus according to <10>, further comprising: a measuring means for measuring in-situ the quantitative index of the dissolved chemical species derived from the oxidation catalyst, wherein the control means controls P based on a value of the quantitative index detected by the measuring means.

<13> The apparatus according to <10>, wherein the quantitative index is an intensity I of an absorption peak attributed to the chemical species.

<14> The apparatus according to <10>, wherein the first transition metal is at least one metal selected from manganese, iron, cobalt, and nickel.

<15> The apparatus according to <10>, wherein the oxidation catalyst is an oxide or hydroxide of at least one selected from the first transition metals.

<16> The apparatus according to <10>, wherein the oxidation catalyst is at least one metal oxide or metal hydroxide selected from manganese oxide (2+, 3+, 4+), iron oxide (2+, 3+), cobalt hydroxide (2+, 3+), and nickel oxide (2+, 3+, 4+).

<17> The apparatus according to <10>, wherein the oxidation catalyst is manganese oxide, and P satisfies 1.65 V<P<1.75 V with respect to a hydrogen electrode (RHE).

<18> A water electrolysis apparatus comprising: a solid polymer electrolytic membrane; an anode and a cathode disposed sandwiching the solid polymer electrolytic membrane; a power supply unit for applying a potential between the anode and the cathode; and a control unit that controls the potential to P satisfying P1<P<P2, wherein an oxidation catalyst containing a spinel-type composite oxide of cobalt and manganese is present on at least a part of a surface of the anode, P1 is a lowest potential at which oxygen is generated from the anode, and P2 indicates a lowest potential P2 at which a quantitative index of a dissolved chemical species derived from the oxidation catalyst begins to show potential dependence.

<19> A water electrolysis apparatus comprising: a solid polymer electrolytic membrane; an anode and a cathode disposed sandwiching the solid polymer electrolytic membrane; and a power supply unit for applying a potential between the anode and the cathode, wherein an oxidation catalyst containing a spinel-type composite oxide of cobalt and manganese is present on at least a part of a surface of the anode.

Advantageous Effects of Invention

According to the present invention, an oxidation catalyst containing a first transition metal enables stable electrolysis of water. For example, as shown in the Examples to be described later, the present invention allows γ-$MnO_2$ to promote the oxygen evolution reaction at 10 $mAcm^{-2}$ in an electrolyte with pH 2 for more than 8000 hours without significant decrease in activity.

Figure 1A:
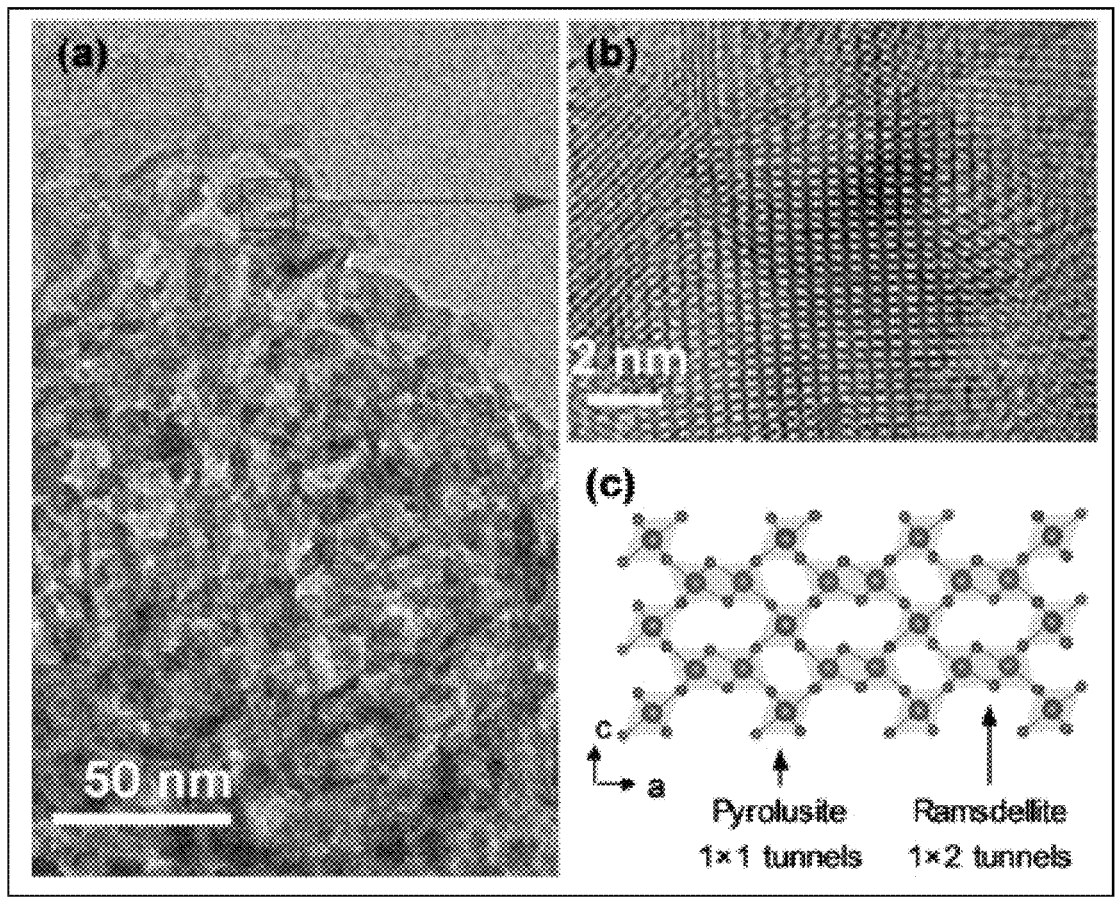
FIG. 1A is a diagram showing a structure of γ-$MnO_2$. In the figure, (a) shows a TEM image of γ-$MnO_2$. (b) shows an HRTEM image of γ-$MnO_2$. (c) is a schematic diagram showing an intergrowth structure of a pyrolusite (1×1 tunnel) matrix and a ramsdellite (1×2 tunnel) matrix.

DESCRIPTION OF EMBODIMENTS (Water Electrolysis Method and Electrolysis Apparatus)

As shown in Examples described later, the present inventors have found that there is a potential window with a stable drive potential that can efficiently promote the oxygen evolution reaction (OER) with a catalyst containing a first transition metal and at the same time suppress the deactivation pathway of the metal. The present invention has been completed based on such findings, and specifically provides the following water electrolysis method and electrolysis apparatus.

A water electrolysis method comprising: supplying at least water into an electrolysis cell which includes a solid polymer electrolyte membrane, and an anode and a cathode disposed sandwiching the solid polymer electrolyte membrane therebetween; and providing a potential P between the anode and the cathode to generate oxygen from the anode, wherein an oxidation catalyst containing at least one of first transition metals is present on at least a part of a surface of the anode, and the potential P satisfies P1<P<P2, wherein P1 indicates a lowest potential at which oxygen is generated from the anode, and P2 indicates a lowest potential P2 at which a quantitative index of a dissolved chemical species derived from the oxidation catalyst begins to show potential dependence.

A water electrolysis apparatus comprising: a solid polymer electrolytic membrane; an anode and a cathode disposed sandwiching the solid polymer electrolytic membrane; a power supply unit for applying a potential between the anode and the cathode; and a control unit that controls the potential to P satisfying P1<P<P2, wherein an oxidation catalyst containing at least one of first transition metals is present on at least a part of a surface of the anode, P1 is a lowest potential at which oxygen is generated from the anode, and P2 indicates a lowest potential P2 at which a quantitative index of a dissolved chemical species derived from the oxidation catalyst begins to show potential dependence.

In the present invention, the anode (positive electrode) means an electrode that is connected to the positive electrode of the power supply unit, causes an oxidation reaction, and generates oxygen in the electrolysis of water, and an oxidation catalyst containing at least one of the first transition metals is present on at least a part of the surface.

The first transition metal (3d transition metal) according to the present invention is not particularly limited, and examples thereof include manganese, iron, cobalt, and nickel, but manganese is preferable from the viewpoint of abundance in nature, durability of the catalyst, and ease of synthesis.

In addition, the oxidation catalyst used in the present invention does not have to contain a noble metal, and even when contained in an embodiment, as the ratio, the molar ratio of the noble metal may be 10% or less, 5% or less, 1% or less, 0.1% or less, or 0 based on the total molar ratio of all metals in the catalyst.

The oxidation catalyst according to the present invention may contain an oxide or hydroxide of a first transition metal, and it is possible to list, for example, at least one metal oxide or metal hydroxide selected from manganese oxide (2+, 3+, 4+), iron oxide (2+, 3+), cobalt hydroxide (2+, 3+), and nickel oxide (2+, 3+, 4+).

Examples of the manganese-containing compound include pyrolusite ((β-MnO$_2$), ramsdellite (RMnO$_2$), and nsutite (γ-MnO$_2$) [see Reference 25]. Pyrolusite is one of the most abundant manganese ore species, and the structure thereof is composed of a single chain of a ridge-sharing [MnO$_6$] octahedron that is joined by sharing corners so as to form a 1×1 tunnel framework with unit cell parameters a (β)=4.39 (8) Å, b (β)=4.39 (8) Å, and c (β)=2.87 (3) Å [see Reference Document 26]. Ramsdellite is a relatively rare mineral, and the structure thereof is composed of asymmetric [MnO$_6$] double strands that share two ridges so as to form a 1×2 tunnel framework with unit cell parameters a (R)=4.52

(1) Å, b (R)=9.27 (3) Å, and c (R)=2.86 (4) Å [see Reference Document 27]. Among these, it is desirable that the oxidation catalyst according to the present invention contains $\gamma\text{-}MnO_2$.

The oxidation catalyst according to the present invention may be a composite oxide or a composite hydroxide of multiple types of first transition metals. Examples of the oxide or hydroxide of the multiple types of first transition metals include a composite oxide of cobalt and manganese (such as a spinel-type cobalt-manganese oxide), and more specifically $Co_{3-x}Mn_xO_4$ ($Co_{0.1}Mn_{0.9}O_4$, $CoMn_2O_4$, $Co_{1.5}Mn_{1.5}O_4$, $Co_2MnO_4$), and among these, it is preferable that $Co_2MnO_4$ is contained in the oxidation catalyst according to the present invention from the viewpoint of easily exhibiting higher stability. From another point of view, according to the present embodiment, that is, in the embodiment where a composite oxide formed by compounding cobalt with manganese is used as a catalyst, the width of the stably-drivable potential window determined by the method of the present invention can be widened (more specifically, the upper limit potential P2 of the potential window can be increased) in an embodiment using manganese oxide as a catalyst.

The form of the oxidation catalyst of the present invention is not particularly limited, but can usually be in the form of a catalyst supported on an anode (support). Examples of the support for supporting the catalyst include conductive ceramics such as FTO (fluorine-doped tin oxide) and ITO (indium tin oxide), metals such as nickel and platinum, and carbon (conductive carbon material) such as acetylene black and Ketjen Black.

The method for preparing the catalyst of the present invention is not particularly limited, and the catalyst of the present invention can be easily prepared by a known method. Examples of the method for supporting the catalyst of the present invention on the support include a thermal decomposition method, a spray method, a kneading method, an impregnation method, an adsorption method, and an ion exchange method. In addition, the oxidation catalyst may be present on at least a part of the surface of the support (anode), and for example, the oxidation catalyst may be present on 10% or more, 20% or more, 30% or more, 40% or more, 50% or more, 60% or more, 70% or more, 80% or more, 90% or more, or 100% of the surface thereof.

The specific surface area of the catalyst of the present invention is not particularly limited, but is usually 5 to 200 $m^2/g$, preferably 10 $m^2/g$ or more, more preferably 20 $m^2/g$ or more, further preferably 50 $m^2/g$ or more, and more preferably 70 $m^2/g$ or more. As a method for measuring the specific surface area of the catalyst, a BET (Brunauer-Emett-Teller) method for analyzing the adsorption of nitrogen can be employed as shown in Examples to be described later.

Furthermore, the catalyst of the present invention may appropriately contain components other than the above-mentioned first transition element, base, and carbonate. Examples of such components include polymer electrolytes such as perfluorosulfonic acid polymers (such as NAFION; trade name), and conductive carbon materials such as acetylene black and Ketjen Black.

In the present invention, the cathode (negative electrode) may be an electrode that is connected to the negative electrode of the power supply unit, causes a reduction reaction, and generates hydrogen in the electrolysis of water, and examples thereof include a platinum electrode. The solid polymer electrolyte membrane disposed between the anode and the cathode may be a membrane composed of a polymer electrolyte insoluble in water, and may also be referred to as an ion exchange membrane. Examples of such a polymer electrolyte include perfluorosulfonic acid polymers (such as NAFION; trade name). In addition, the electrolysis cell including a solid polymer electrolyte membrane and an anode and a cathode disposed sandwiching the solid polymer electrolyte membrane therebetween is not particularly limited, and ones known in the art (particularly, proton-exchange membrane (PEM) electrolysis) can be appropriately used.

In the present invention, the water supplied to the electrolysis cell and electrolyzed may be only water (so-called pure water), or may be in the form of an aqueous solution containing an electrolyte or the like. Examples of such an electrolyte include phosphate ion, sulfate ion, carbonate ion, arsenate ion, phosphite ion, silicate ion, and borate ion, and among these, phosphate ion and sulfate ion are preferable, and phosphate ion is more preferable, from the viewpoint that the stability of the first transition metal can be more easily enhanced. In particular, when phosphate ions are used, the width of the stably-drivable potential window determined by the method of the present invention can be widened (more specifically, the upper limit potential P2 can be increased).

In addition, the pH of water is not particularly limited, but the vicinity of the anode is usually acidic. Examples of such acidic conditions include a pH of less than 7 (pH 6, pH 5, pH 4, pH 3, pH 2, pH 1).

Normally, a potential is provided between the anode and cathode to electrolyze water, and in the present invention, this potential (P) is adjusted to satisfy a predetermined range, and the range (P1<P<P2) can be determined by the method described later.

The "control unit that controls the potential to P satisfying P1<P<P2" provided in the water electrolysis apparatus of the present invention may be any apparatus capable of adjusting the potential provided by inputting P1 and P2 predetermined by the method described later, and examples thereof include potentiostats and potential programmers. In addition, the water electrolysis apparatus of the present invention may further comprise a measuring means for measuring in-situ the quantitative index of the dissolved chemical species to be described later, wherein the control means controls P based on a value of the quantitative index detected by the measuring means. Examples of such in-situ measuring means include a UV-Vis spectrometer used in the in-situ spectroscopy described later.

(Method for Determining Drive Potential)

As shown in Examples described later, the present inventors have found that there is a potential window with a stable drive potential that can efficiently promote the oxygen evolution reaction (OER) with a catalyst containing a first transition metal and at the same time suppress the deactivation pathway of the metal. Therefore, the present invention provides the following method for determining the drive potential.

A method for determining a drive potential P of an electrolytic cell for water electrolysis including a solid polymer electrolyte membrane, an anode having an oxidation catalyst containing at least one of first transition metals, and a cathode, comprising: predetermining a lowest potential P1 between the anode and the cathode at which oxygen begins to be generated from the anode; predetermining a lowest potential P2 between the anode and the cathode at which a quantitative index of a dissolved chemical species derived from the electrolytic catalyst begins to show potential dependence; and determining the drive potential P to a value satisfying a condition P1<P<P2.

The "lowest potential P1 between the anode and the cathode at which oxygen begins to be generated from the anode" can be appropriately determined by those skilled in the art using a known method according to the type of oxidation catalyst used, the type of water, the type of electrolyte contained therein, the pH of water, and the like. As shown in Examples described later, examples of the known method include a method of detecting the amount of oxygen generated in the electrolytic cell for electrolysis with a thermal conductivity detector (TCD) and/or gas chromatography while changing the applied potential.

Regarding the lowest potential P2 between the anode and the cathode at which a quantitative index of a dissolved chemical species derived from the oxidation catalyst begins to show potential dependence, the "quantitative index of a dissolved chemical species derived from the oxidation catalyst" may be any one that reflects the amount of the chemical species dissolved (eluting) from the oxidation catalyst, and examples thereof include the intensity of the absorption peak attributed to the chemical species. Also, as to whether the intensity or the like of the absorption peak begins to show potential dependence, for example, it is possible to list in situ spectroscopy (more specifically, in situ UV/Vis spectroelectrochemical measurement), as shown in Examples described later.

Also, in the present invention, the drive potential P can be determined by obtaining a first curve formed by plotting the amount of oxygen evolution from the anode against a potential between the anode and the cathode; obtaining a second curve formed by plotting a quantitative index of a dissolved chemical species derived from the oxidation catalyst against the potential between the anode and the cathode; and comparing between the first curve and the second curve.

To explain using an example of γ-$MnO_2$ on FTO at pH (FIG. 3C), in the first curve (Oxygen evolution) formed by plotting the amount of oxygen evolution present on the surface of the oxidation catalyst containing γ-$MnO_2$ against the potential, the potential with respect to the hydrogen electrode (vs. RHE) starts to rise at 1.60 V. On the other hand, the second curve formed by plotting the absorption peak intensity derived from $MnO_4^-$ dissolved from the oxidation catalyst against the potential starts to rise at 1.75 V. Therefore, when the oxidation catalyst is manganese oxide, those skilled in the art can use the curves to determine the drive potential to 1.60 V to 1.75 V (preferably 1.65 V to 1.75 V) with respect to the hydrogen electrode.

Figure 8:
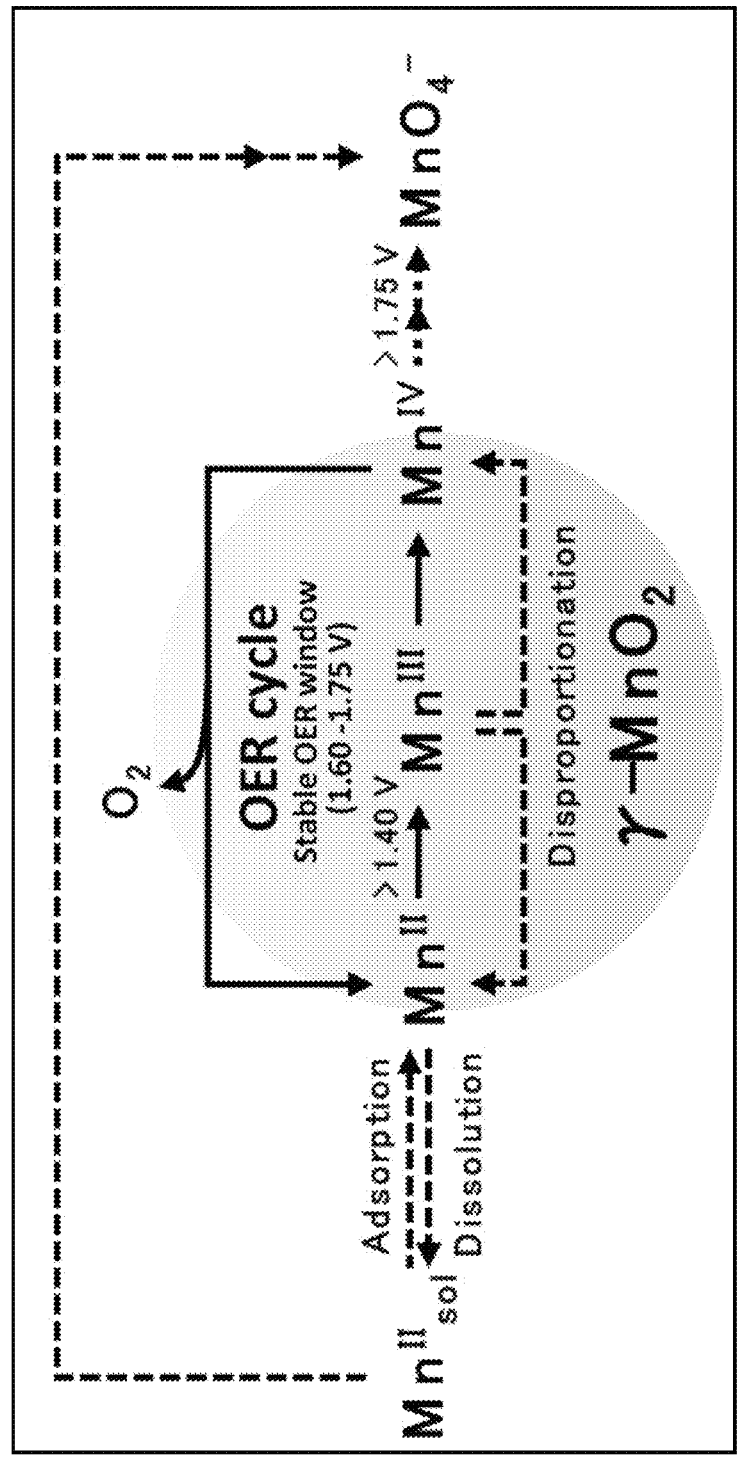
FIG. 8 is a schematic diagram showing a chemical species derived from γ-MnO$_2$ that occurs during an OER cycle under acidic conditions and a side reaction thereof.

Note that FIG. 8 shows the change of γ-$MnO_2$ that occurs during the OER cycle under acidic conditions and a side reaction thereof as a schematic diagram. In the figure, the solid line indicates the OER cycle. The dashed lines indicate side reactions such as dissolution/redeposition of manganese oxide, disproportionation of $Mn^{III}$, and $MnO_4^-$ chemical species. The potential in the figure is a value determined by the above method. The chemical species circled in gray are considered to be stable on the γ-$MnO_2$ electrode.

Figure 4:
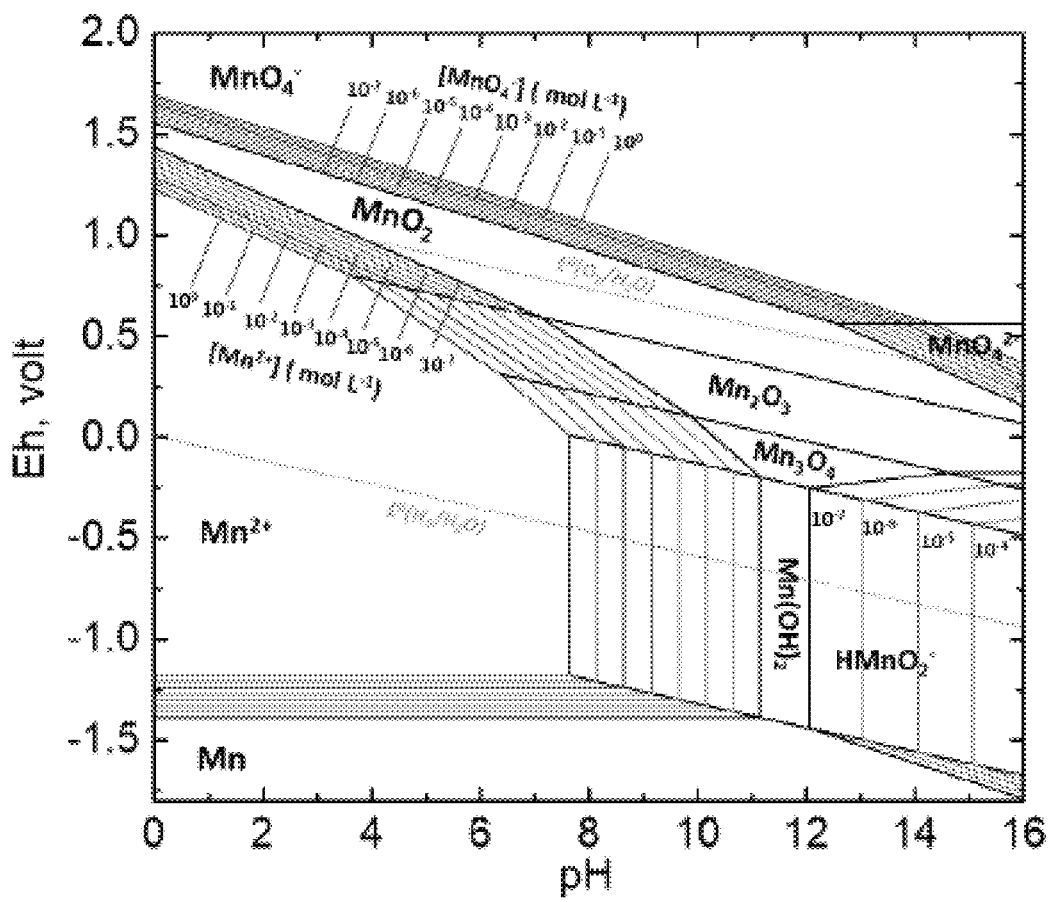
FIG. 4 is a Pourbaix diagram of the Mn—H$_2$O system calculated using the CHNOSZ package [see Reference Document 19]. For MnO$_2$, Mn$^{2+}$, MnO$_4^-$, MnO$_4^{2-}$, Mn$_2$O$_3$, Mn$_3$O$_4$, Mn(OH)$_2$, and Mn, the free energies of formation (ΔG0) used were −465.15 kJmol$^{-1}$, −227.76 kJmol$^{-1}$, −449.66 kJmol$^{-1}$, −504.09 kJmol$^{-1}$, −888.857 kJmol$^{-1}$, −1281.16 kJmol$^{-1}$, −615.04 kJmol$^{-1}$, and 0 kJmol$^{-1}$, respectively. The activity of the solution species (MnO$_4^-$, MnO$_4^{2-}$, Mn$^{2+}$, HMnO$_2^-$) changed from $10^{-7}$ to $10^0$ molL$^{-1}$ at T=25° C.

In addition, as shown in Examples described later, in an experiment using manganese oxide as a catalyst, the potential window that can be stably driven as determined by in-situ analysis is about 220 mV wider than the range expected based on the Pourbaix diagram for manganese shown in FIG. 4.

Therefore, based on the determination method of the present invention and the above-mentioned new findings regarding manganese, furthermore, depending on the properties of the solid polymer electrolyte membrane (such as anode side pH) to be combined as necessary, even in an oxidative decomposition system of water using other metals (such as iron, cobalt, and nickel) as a catalyst, predicting from the Pourbaix diagram of the metal, it is possible to determine the potential window (potential range) capable of stable driving even when it is considered that the potential range capable of stable driving is extremely narrow or absent.

EXAMPLES

Hereinafter, the present invention is described in more detail based on Examples, but the present invention is not limited to the following Examples. In addition, these Examples were carried out using the materials and methods shown below.

(Production of γ-$MnO_2$ on FTO Substrate)

On glass coated with fluorine-doped tin oxide (FTO) (SPD Laboratory, Inc.), γ-$MnO_2$ was directly produced by a thermal decomposition method [see Reference Document 18]. Specifically, 0.5 mL of 4M $Mn(NO_3)_2$ (JIS reagent special grade, ≥98.0%, Sigma-Aldrich) was dropped onto a clean FTO-coated glass and calcined in air on a hot plate at 220° C. for 6 hours. The addition of Mn was controlled by the number of drop-calcination cycles. The obtained electrode was washed with Milli-Q ultrapure water (18.2 MΩcm at 25° C., Merck Millipore) and decomposed by ultrasonic waves for seconds. Finally, prior to measurement, the electrode was dried in the oven at 40° C. for several hours.

(Production of γ-$MnO_2$ on Carbon Paper Substrate)

Figure 5A:
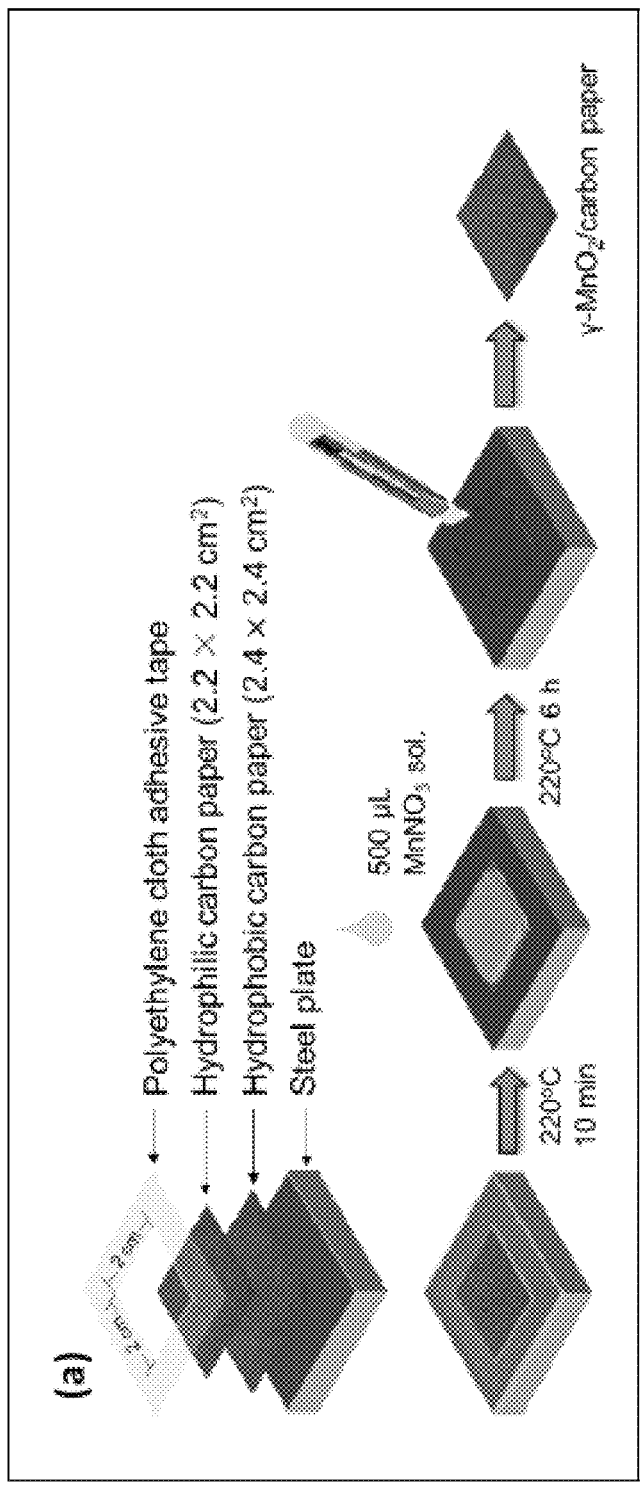
FIG. 5A is a schematic diagram showing a procedure for producing an anode (γ-MnO$_2$/carbon paper).

On hydrophilic carbon paper (HGP-H-060, thickness 190 μm, Toray), γ-$MnO_2$ was produced. As the outline is shown in FIG. 5A, first, a 2.2×2.2 $cm^2$ hydrophilic carbon paper was placed in the center of a 2.4×2.4 $cm^2$ hydrophobic carbon paper (EC-TP1-060T, Teflon (registered trademark) treated, thickness 190 μm, Toray). Then, by use of a polyethylene cloth adhesive tape (Teraoka Tape), hydrophilic carbon paper and hydrophobic carbon paper were attached at the center of the stainless steel sample holder. The composition was pretreated on a hot plate at 220° C. for 10 minutes to obtain better adhesion. After cooling to room temperature, 0.5 mL of 4M $Mn(NO_3)_2$ was dropped onto the exposed hydrophilic carbon paper and calcined in air on a hot plate at 220° C. for 6 hours. The obtained electrode was washed with Milli-Q ultrapure water and decomposed by ultrasonic waves for 10 seconds. Finally, prior to use, the electrode was dried in the oven at 40° C. for several hours.

(Characteristic Evaluation)

After production, the characteristics of the catalyst were evaluated by XRD, XPS, Raman spectroscopy, TEM, HRTEM, and N2 adsorption-desorption isotherm.

The XRD pattern was collected by a SmartLab (Rigaku) device using Cu-Kα radiation (λ=1.5418 Å) with an operating voltage of 40 kV and a current of 200 mA. A low scan rate of 0.05°/min was applied to record patterns in the range of 10 to 90° (2θ) on a 0.01° measurement step. No characteristic peaks could be observed for α-$MnO_2$, δ-$MnO_2$, $Mn_3O_4$, and MnO.

XPS was performed using a surface analyzer (PHI 5000 Versa Probe II, ULVAC-PHI). Monochrome Al Kα (1486.6 eV) irradiation was used for all XPS measurements.

Raman spectra were collected with a Raman microscopy system (Senterra, Bruker) using an excitation wavelength of 532 nm (0.02 mW) and a metallurgical objective lens (MPlan 50×, NA=0.75, Olympus, Tokyo, Japan). Raman spectra were acquired as 100 integrations with an exposure time of 15 seconds. A low power of 0.02 mW was employed to avoid the damage induced by laser irradiation.

TEM images were acquired using a Hitachi HT7700 microscope. For the TEM sample, a sample suspending agent was dropped onto a copper grid and dried in air. HRTEM images were acquired using a JEM-2100 microscope at 200 kV. The HRTEM sample was prepared by dropping a sample suspending agent onto a lacey carbon support and drying in air.

The surface area and pore structure of the manganese oxide were inspected by measuring nitrogen adsorption-desorption isotherms at a liquid nitrogen temperature (77K) using a surface area analyzer (Micromeritics ASAP2000 apparatus). The sample was degassed at 373 K for 9 hours prior to measurement. The specific surface area of manganese oxide was evaluated as 71.2 $m^2$ $g^{-1}$ based on the Brunauer-Emmett-Teller (BET) equation [see Reference Document 19]. The average adsorption pore width of the manganese oxide was evaluated to be 10.3 nm based on the fitting analysis using the Barrett-Joyner-Halenda (BJH) method [see Reference Document 20].

(Evaluation of Characteristics of Electrolytic Catalyst)

The electrochemical behavior of γ-$MnO_2$ was evaluated in a 3-electrode electrochemical cell using 30 mL of electrolyte. The electrodes were pretreated with a sulfuric acid solution (1.0 M $H_2SO_4$) (Wako Pure Chemical Industries, Ltd.) at a current density of 10 $mAcm^{-2}$ for 2 hours. Thereafter, using Pt wire (99.98%, PT-351325, 00.30 mm, Nilaco) as a counter electrode and Ag/AgCl/KCl (saturated KCl, World Precision Instruments) as a reference electrode in 1.0M $H_2SO_4$, current density (j) vs. potential (U) curve were obtained with a commercially available potentiostat and potential programmer (HZ-5000, Hokuto Denko) at a sweep rate of 1 $mVs^{-1}$ at room temperature (25±2° C.). A sulfuric acid electrolyte containing 0.5M $Na_2SO_4$ (Wako Pure Chemical Industries, Ltd.) was used as a supporting electrolyte for the electrochemical measurement at pH 2. The iR correction value of the working electrode and the reference electrode was measured by electrochemical impedance spectroscopy (i, current; R, resistance). The iR-corrected electrode potential was rescaled to a reversible hydrogen electrode (RHE). Since all measurements were performed using the Ag/AgCl/KCl reference electrode, the conversion of the potentials for vs. Ag/AgCl or vs. RHE was performed using the following formula $$E(vs.RHE)=E(vs.Ag/AgCl)+0.199V+0.0591V\times pH.$$

(Faraday Efficiency)

Hydrogen and oxygen were generated from water electrolysis at a constant current density of 10 $mAcm^{-2}$ in an electrolyte with pH 2 (anode: γ-$MnO_2$/FTO, cathode: Pt). The generated $H_2$ and $O_2$ were analyzed by online gas chromatography (Agilent, GC-7890A) equipped with a thermal conductivity detector (TCD) and a stainless steel column filled with molecular sieves. Argon was used as the carrier gas.

(Change Over Time in Mn Dissolution)

The amount of elements leached into the electrolyte during OER was analyzed by inductively coupled plasma atomic emission spectroscopy (ICP-AES, Shimadzu, model ICPS 8100). Samples were collected at various points in time during the OER process.

(Electrochemical UV-Vis Spectroscopy Measurement)

A UV-Vis absorption spectrum was obtained using a UV-Vis spectrometer (UV-2550, Shimadzu) in diffusion transmission mode together with a built-in integrating sphere (MPC-2200, Shimadzu). A manganese oxide thin membrane electrode mounted in a quartz electrochemical cell (2 cm×2 cm×2.5 cm height) filled with 7 mL of electrolyte was placed in front of the integrating sphere for in-situ acquisition of the spectrum.

(Proton-Exchange Membrane (PEM) Electrolyzer)

A membrane electrode assembly (MEA) was prepared using Nafion (registered trademark) 117 polymer membrane (Dupont, thickness 177.8 μm, N117). Prior to preparing MEA, N117 membranes were each boiled in the following solutions for 1 hour to remove possible contaminants and ensure that the membranes were completely protonated. First, 3 wt % $H_2O_2$, then Milli-Q ultrapure water, then 1.0 M $H_2SO_4$, and finally Milli-Q ultrapure water again. Finally, prior to use, the N117 membrane was dried in an oven at 40° C. for several hours.

MEA was made using Pt as the cathode for the hydrogen evolution reaction and $MnO_2$ as the anode for the oxygen evolution reaction. First, a Pt slurry was prepared by mixing Pt/C (20 wt % Pt in carbon black, Fuel Cell Earth), water, ethanol, and a Nafion (registered trademark) solution (5 wt % in $H_2O$, Sigma-Aldrich) as a binder. Then, this catalyst ink mixture was supplied onto the hydrophobic Toray carbon paper with a mass supply of 0.1 $mgcm^{-2}$ and 0.03 $mgcm^{-2}$ for Pt and Nafion (registered trademark), respectively, and left to dry at 40° C. for several hours in an oven. $MnO_2$/carbon paper was prepared with a manganese supply of 3.5±0.5 $mgcm^{-2}$ as described in the above item "Production of γ-$MnO_2$ on Carbon Paper Substrate." After deposition of the catalytic material, its surface was coated with an additional amount of Nafion (registered trademark) (0.6 $mgcm^{-2}$ and 1.0 $mgcm^{-2}$ based on the cathode and anode, respectively). Both the resulting Pt/carbon and $MnO_2$/carbon samples were left to dry in an oven at 40° C. for several hours. Then, MEA was prepared by thermocompression bonding of Pt/carbon paper and $MnO_2$/carbon paper on both sides of a commercially available N117 membrane for 10 minutes with a mold clamping force of 5 MPa at 135° C. The effective area of MEA was 2 cm×2 cm (4 $cm^2$).

The electrolysis test was performed using a single cell PEM electrolyzer (FC-R&D, PEM-3036, Kanagawa, Japan). A stainless steel mesh was used as the gas diffusion layer for both the anode and the cathode. The MEA was assembled to the PEM electrolyzer using a rubber gasket. The measurement was performed using a potentiostat (HZ-7000, Hokuto Denko). During the PEM electrolysis operation, the cell was supplied with deionized water on the anode side of the cell. The current-voltage curves and constant current stability of the cells at 40 mA and 400 mA were tested at 25° C. The voltage efficiency was calculated using the following formula [see Reference Document 21].

$$\eta_{voltage}=E_{eq}/E_{cell}\times 100\%=1.23V/E_{cell}\times 100\%(25°\ C.)$$

In the formula, $E_{cell}$ is the cell voltage and $E_{eq}$ is the equilibrium voltage.

Example 1

γ-$MnO_2$ is well known as a cathode material for dry batteries, and its industrial scale synthesis has historically been carried out in concentrated sulfuric acid (pH<1), suggesting an inherent chemical stability in an acidic environment [see Reference Document 9]. In the present Example, γ-$MnO_2$ was produced on fluorine-doped tin oxide (FTO) or a carbon-based substrate by thermally decomposing manganese nitrate at 220° C. in the air. Although not shown in the figure, transmission electron microscopy (TEM) images revealed that $MnO_2$ nanoparticles having a diameter of about 15 nm were bound in the porous aggregate. $N_2$ adsorption-desorption isotherm measurements have shown a high surface area (71.2 m$^2$ g$^{-1}$) of γ-MnO$_2$ caused by the mesoporous structure (average pore size: 10.3 nm).

Figure 1B:
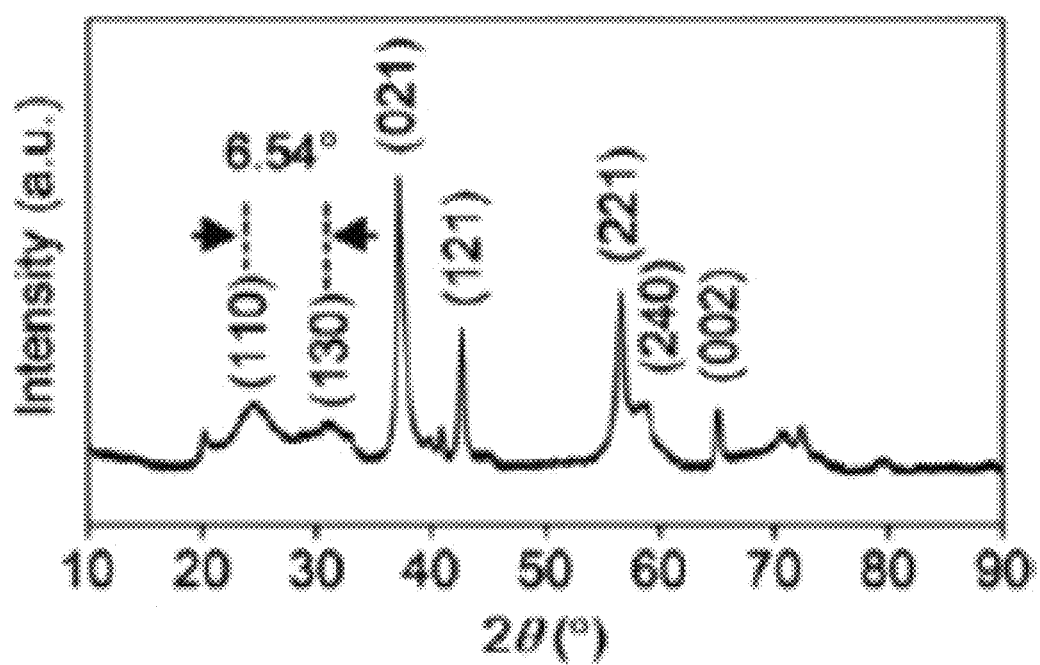
FIG. 1B is a diagram showing a typical XRD pattern of γ-$MnO_2$.
Figure 1C:
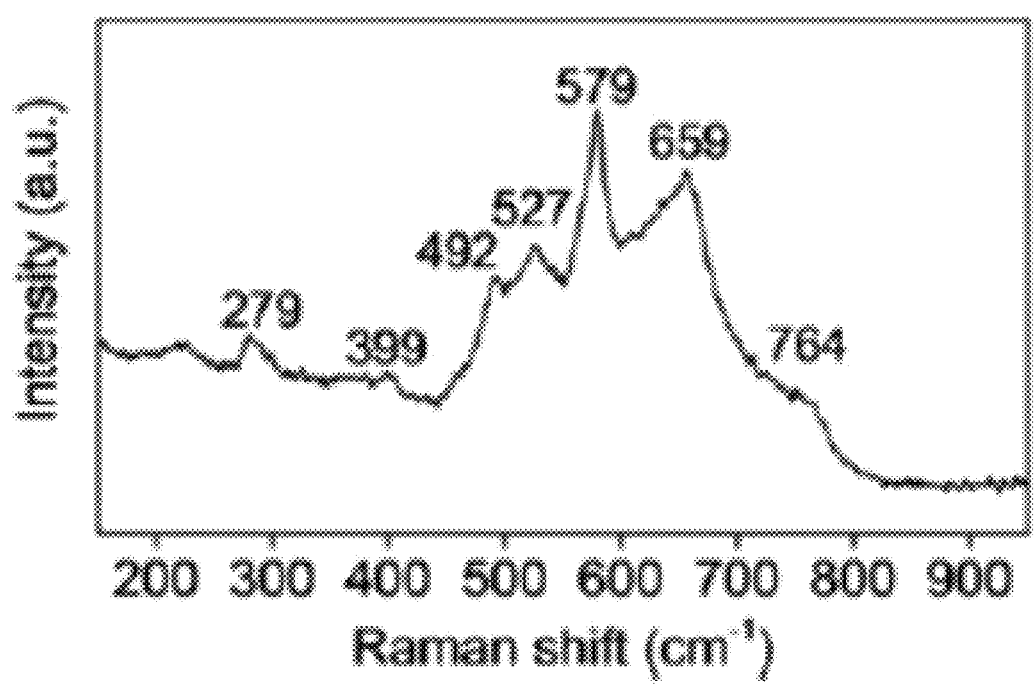
FIG. 1C is a diagram showing a typical Raman spectrum of γ-$MnO_2$.

A striking structural feature of γ-MnO$_2$ is the intergrowth of pyrolusite (β-MnO$_2$ composed of symmetric octahedral units) phase and ramsdellite (R—MnO$_2$ composed of symmetric octahedral units) phase, and produces alternating structures of single and double [MnO$_6$] unit cells, as can be seen from the high resolution transmission electron microscopy (HRTEM) images (FIG. 1A) [see Reference Document 10]. It is suggested that the ratio of pyrolusite (Pr ratio) is about 70% from the division of the XRD peaks on the planes (110) and (130) (FIG. 1B) and the Raman shift of Mn—O expansion and contraction oscillations in the region 400 to 800 cm$^{-1}$ (FIG. 1C) [see Reference Documents 9b and 11].

The electrochemical behavior of γ-MnO$_2$ was evaluated by linear sweep voltammetry (LSV) at a potential sweep rate of 1 mVs$^{-1}$ in 1.0 M sulfuric acid (FIGS. 2A and 2B). γ-MnO$_2$ required an overvoltage of 489±5 mV to reach a current density (geometric region) of 10 mAcm$^{-2}$ on the FTO substrate. Online gas chromatography measurements revealed that the Faraday efficiency of oxygen evolution and the H$_2$/O$_2$ ratio were about 100% and 2, respectively, indicating that the oxidation current was derived solely from the oxidation of water. By simply changing the substrate to porous carbon paper, the overvoltage dropped to 428±5 mV. This is the lowest value among the 3d-metal OER catalysts reported so far in an acidic environment [see Reference Documents 3b, 7b-e, and 12]. Since the Tafel slope remained at about 80 mVdec$^{-1}$ (FIG. 2B), it is expected that the 5-time increase in current density is due to the increase in surface area.

Example 2

It is well known that manganese oxide dissolves during water electrolysis, especially under acidic conditions. Even materials reported to be stable, such as electrodeposited manganese oxide, show a noticeable increase in overvoltage in a short period of time at relatively low current densities (less than 1 mAcm$^{-2}$) [see Reference Documents 12a and b]. Leaching of manganese was also observed in titanium-doped manganese oxide and ternary oxide Ni$_{0.5}$Mn$_{0.5}$Sb$_{1.7}$O$_y$ [see Reference Documents 7d and 7b]. Currently, there are no reports of stable Mn oxides in acidic electrolytes under OER conditions over a period of several months.

Figure 3A:
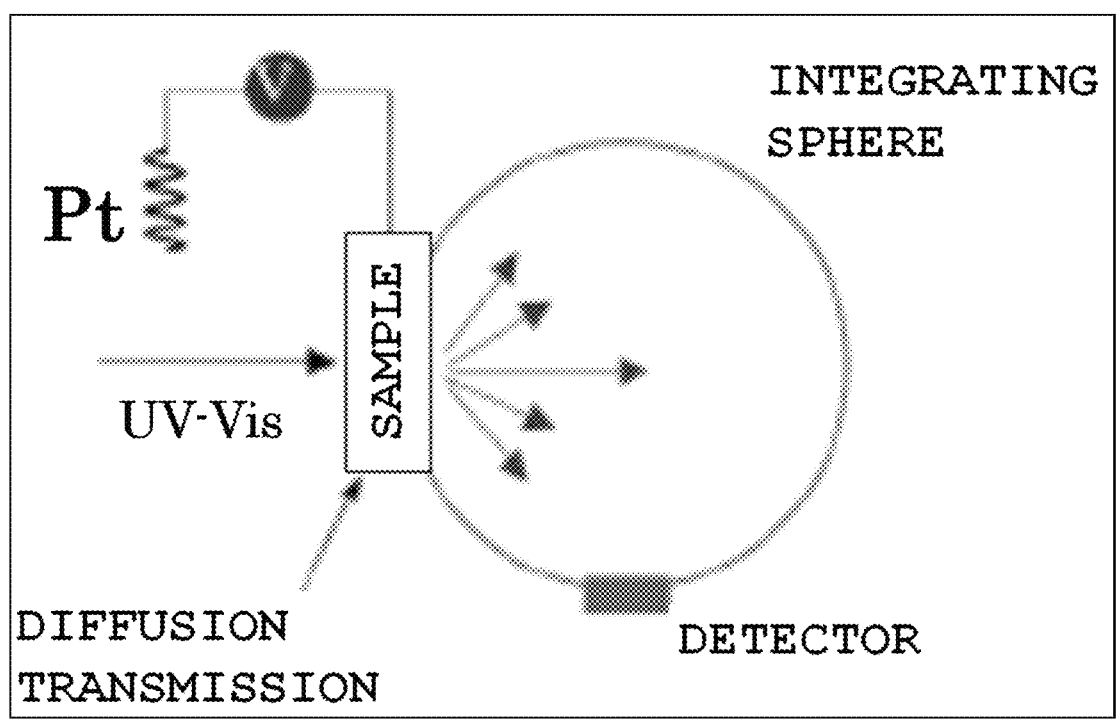
FIG. 3A is a diagram showing an overview of an experimental mechanism for in-situ UV-Vis measurement. The working electrode was placed immediately in front of the detector window, and the reference electrode and counter electrode were placed adjacent to the wall of the electrochemical cell.
Figure 3B:
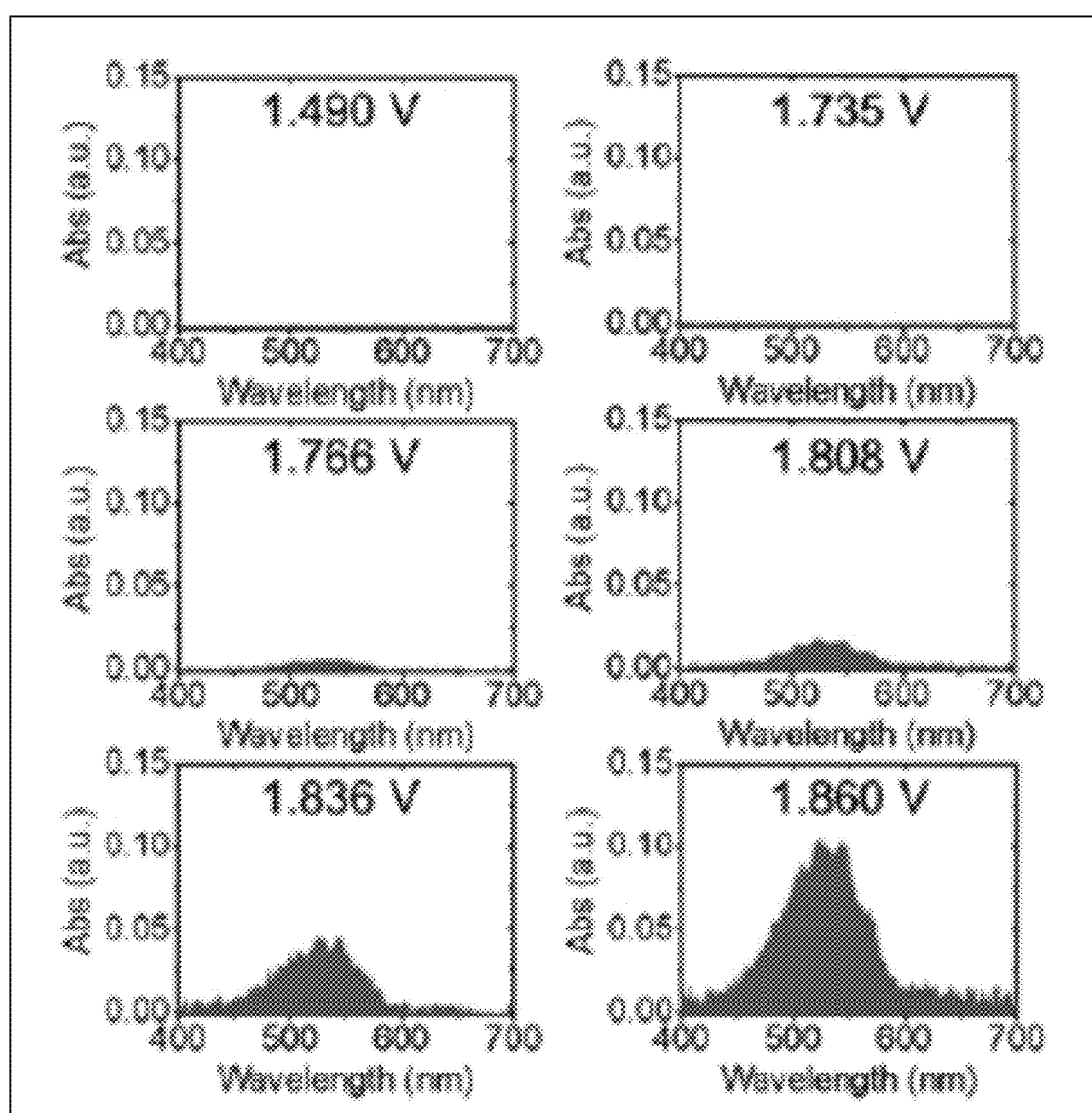
FIG. 3B is a diagram showing a UV/Vis absorption spectra of an electrolyte 1 hour after electrolysis at the presented potential. The measurement is for γ-MnO$_2$ on the FTO at pH 2.

To clarify the mechanism leading to the destabilization of MnO$_2$ under acidic conditions, the present inventors performed in situ UV/Vis spectroelectrochemical measurements of both the γ-MnO$_2$ electrode and the electrolyte during water electrolysis at pH 2 (FIG. 3A). Although not shown in the figure, the in situ UV/Vis spectrum of the electrode is consistent with the present inventors' previous studies using other phases of manganese oxide, and an absorption peak (480 nm), which is thought to be caused by surface-adhered Mn$^{3+}$, was observed before the start of the OER current [see Reference Documents 13 and 14]. In contrast, the UV/Vis spectrum of the electrolyte showed significantly different voltage dependence with no change in absorption near the starting potential of the OER (FIG. 3B). In contrast, the UV/Vis spectrum of the electrolyte showed significantly different potential dependence with no change in absorption near the starting potential of the OER (FIG. 3B). Only when the potential was increased to about 1.8 V vs. RHE (hereinafter, all potentials are shown below vs. RHE), new absorption characteristics believed to be due to MnO$_4^-$ were observed at 525 and 545 nm [see Reference Document 15].

Figure 3C:
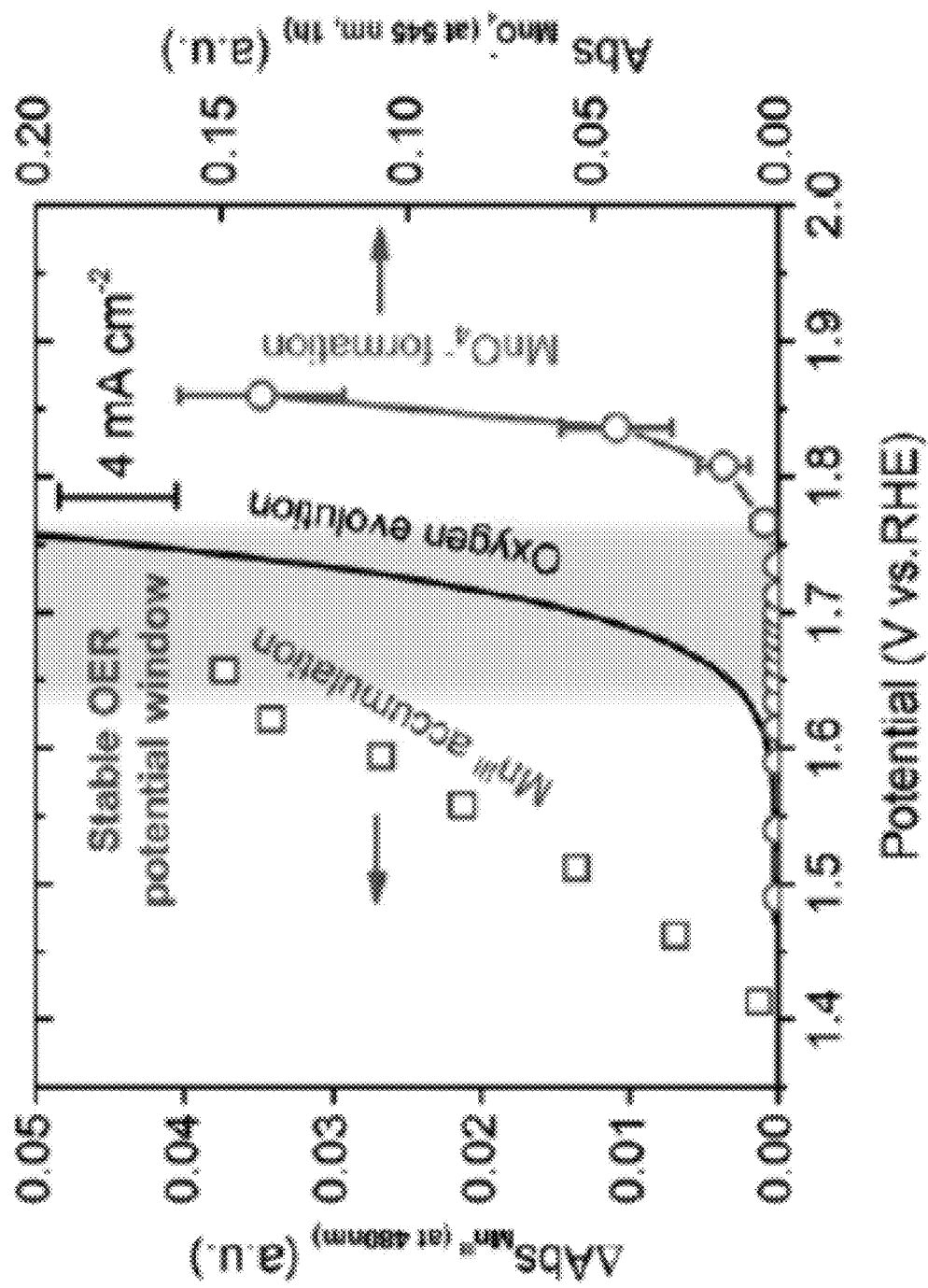
FIG. 3C is a diagram showing potential dependence (squares) of Mn$^{3+}$ accumulation, oxygen evolution current (black line), and MnO$_4^-$ formation (circles). The measurement is for γ-MnO$_2$ on the FTO at pH 2.

FIG. 3C shows how the potential affects the activity and stability of γ-MnO$_2$ as an OER catalyst. When the potential is scanned to the positive side, Mn$^{3+}$ characterized by a 480 nm peak in the UV/Vis spectrum of the electrode is generated at 1.4 V [see Reference Document 14]. The generation of this intermediate leads to the start of an OER current at 1.6 V, as with other Mn oxides [see Reference Documents 13 and 16]. Most notably, there is a third potential-dependent process that becomes prominent from 1.8V. This process is the generation of MnO$_4^-$ absorption peaks in the UV/Vis spectrum of the electrolyte, indicating that the major dissolution pathway of the MnO$_2$ electrode is via MnO$_4^-$. Therefore, these results indicate the existence of a stable potential window between 1.6 V and 1.75 V where γ-MnO$_2$ can sustainably promote OER. It should be noted that, due to the overvoltage of dissolution (MnO$_4^-$ formation), the experimentally measured potential window is 220 mV wider than that predicted from the Pourbaix diagram (thermodynamic Pourbaix diagram) shown in FIG. 4 [see Reference Documents 7a and 17].

Figure 3D:
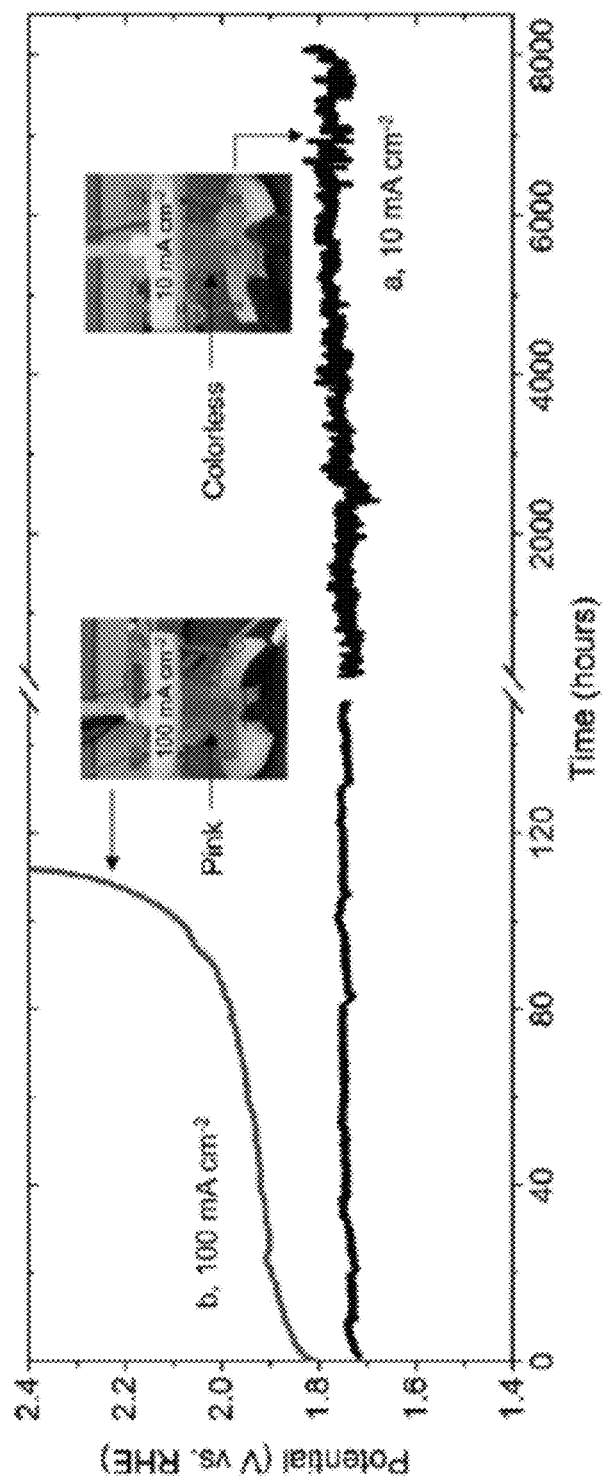
FIG. 3D shows the time dependence of the anode potential during electrolysis at constant current densities of 10 mAcm$^{-2}$ (curve a) and 100 mAcm$^{-2}$ (curve b). The measurement is for γ-MnO$_2$ on the FTO at pH 2.
Figure 5B:
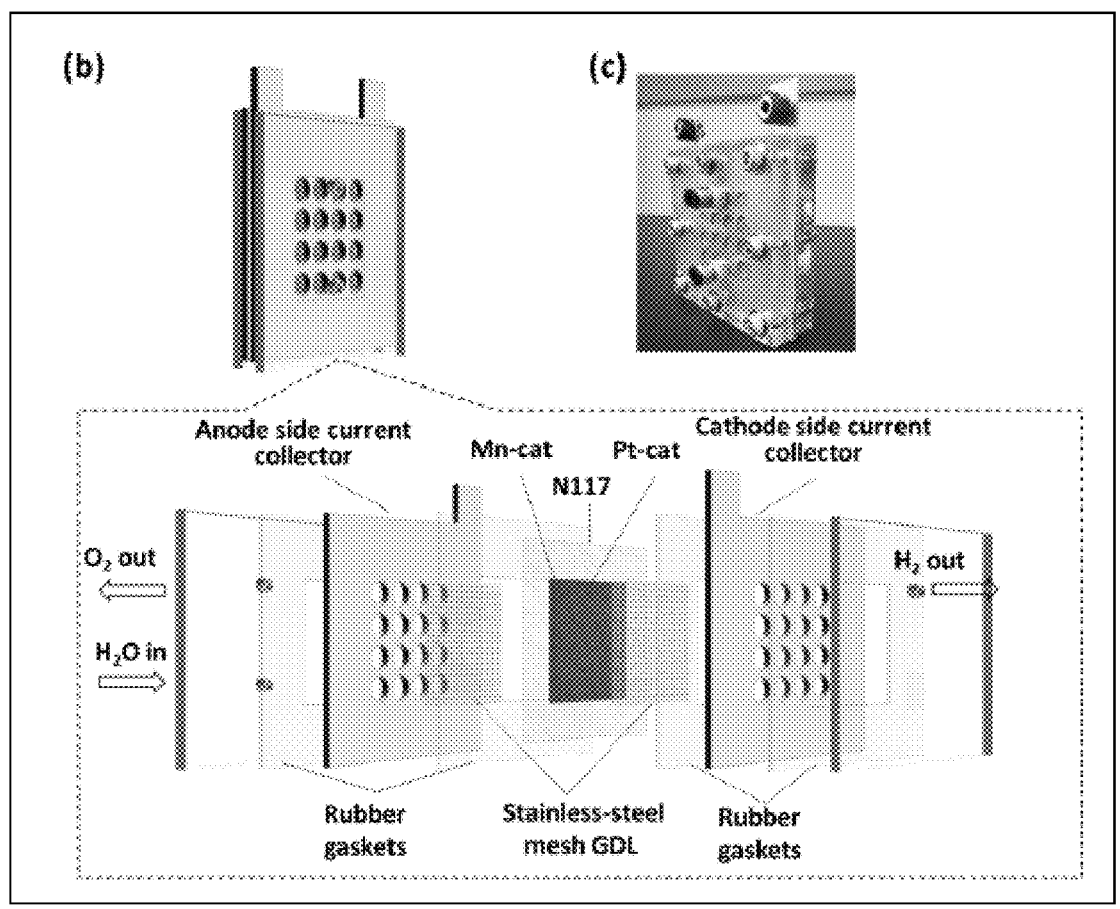
FIG. 5B is a diagram showing an overview of the structure of a PEM electrolyzer.
Figure 5C:
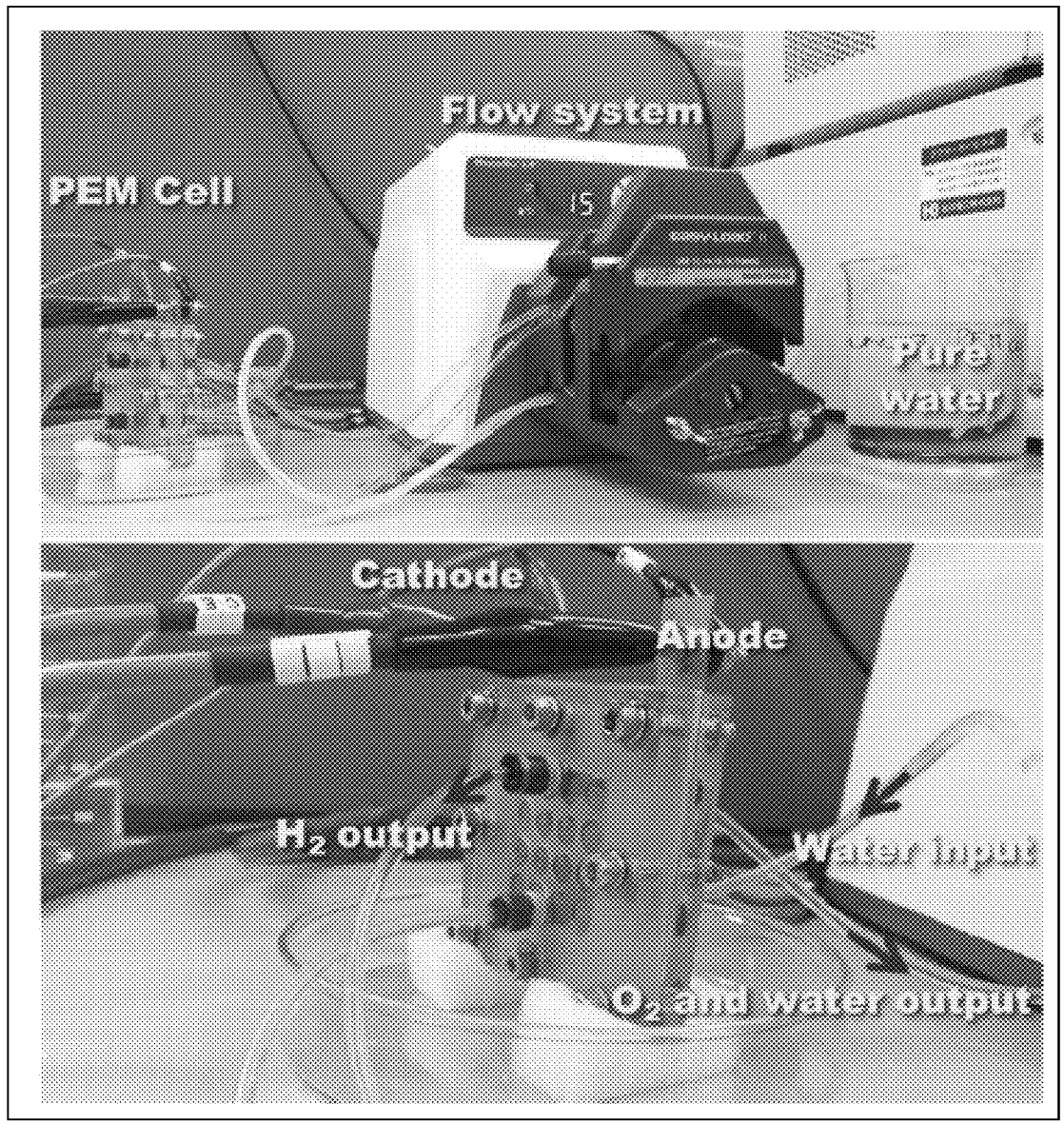
FIG. 5C is a photograph showing a PEM water electrolysis system. Electrolysis was performed using a single stack PEM water electrolyzer cell. Milli-Q ultrapure water was press-fitted into the anode portion of the electrolyzer. The PEM water electrolyzer was used as a two-electrode system and was controlled by potentiostat.

In view of these findings, the present inventors performed water electrolysis under a constant current density in order to explore the possibility of acid-stable MnO$_2$ (FIGS. 5A to 5C). The electrode potential of electrolysis was about 1.73 V vs. RHE at a current density of 10 mAcm$^{-2}$. This is lower than at the start of MnO$_4^-$ formation. In fact, the catalyst did not show a clear decrease in activity after an operating time of more than 8000 hours (>11 months), demonstrating the surprising stability of γ-MnO$_2$ under these electrochemical conditions (FIG. 3D, curve a). Long-term water electrolysis was also confirmed at pH 1. Initial dissolution of Mn$^{2+}$ ions in the electrolyte was detected by inductively coupled plasma atomic emission spectroscopy (ICP-AES), but no soluble Mn$^{2+}$ ions could be observed after 250 hours. This is because Mn ions in the solution were redeposited as γ-MnO$_2$, as evidenced by Raman spectroscopy, XRD, and XPS. This is consistent with the conventional finding [see Reference Documents 9a and b] that Mn$^{2+}$ is preferentially deposited as γ-MnO$_2$ in H$_2$SO$_4$.

In contrast, MnO$_2$ was completely inactivated within 120 hours at 100 mA cm$^{-2}$ (FIG. 3D, curve b) and the electrolyte exhibited a strong pink color due to the formation of MnO$_4^-$. This is because, although the initial electrolytic potential, 1.8 V, deviates from the above-mentioned potential window by only 50 mV, it is sufficiently anodic enough to generate MnO$_4^-$, which eventually leads to dissolution and deactivation of the electrode. Therefore, these results indicate that, by simply ensuring that the applied electrochemical potential is within a particular operating window, it is possible to utilize γ-MnO$_2$ as a long-term OER catalyst even under highly acidic conditions. The continuous oxygen evolution of 8000 hours in this system is approximately 50 times longer than the values reported for the best performing earthly abundant metal oxides reported so far [see Reference Documents 7b-e and 12d], and exceeds the 3000-hour benchmark, which roughly corresponds to 1-year operation assuming 8 hours of operation per day. The upper limit of the potential obtained by in situ spectroscopy is about 220 mV higher than that calculated thermodynamically from the Pourbaix diagram (FIG. 4) [see Reference Documents 7a and 17]. This difference is important considering that the Tafel slope is 80 mV dec$^{-1}$ (FIG. 2B), indicating that this additional driving force corresponds to an increase in nearly 3-digit OER current. Therefore, both the highest levels of stability and activity reported so far could be achieved simultaneously.

Example 3

Figure 2A:
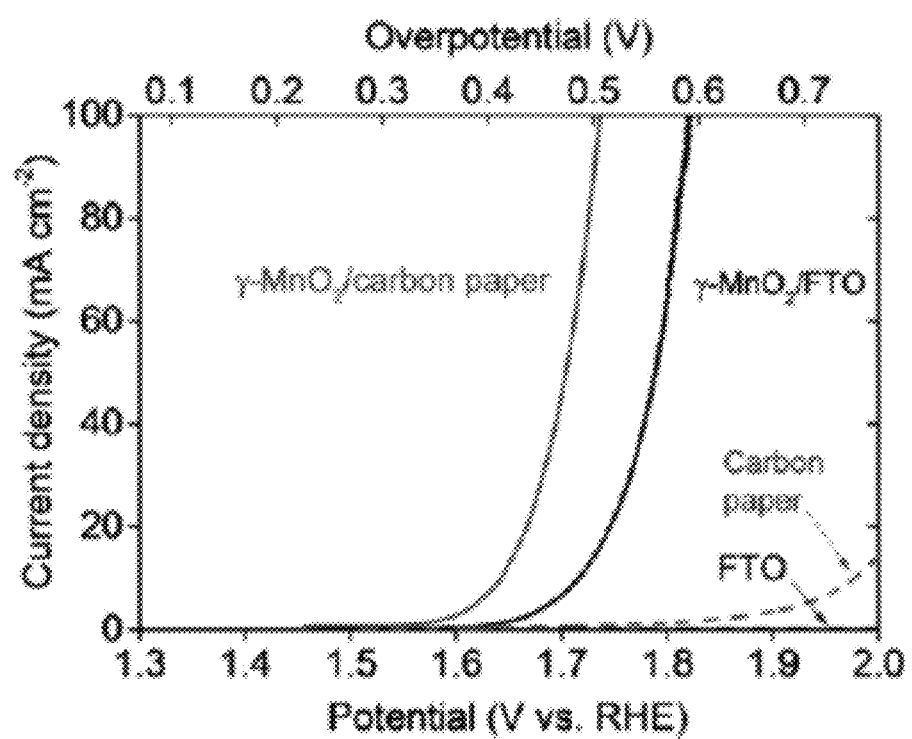
FIG. 2A is a diagram showing a linear sweep voltammogram of γ-$MnO_2$ on FTO and carbon paper in 1.0 M $H_2SO_4$ (scan rate: 1 $mVs^{-1}$).
Figure 2B:
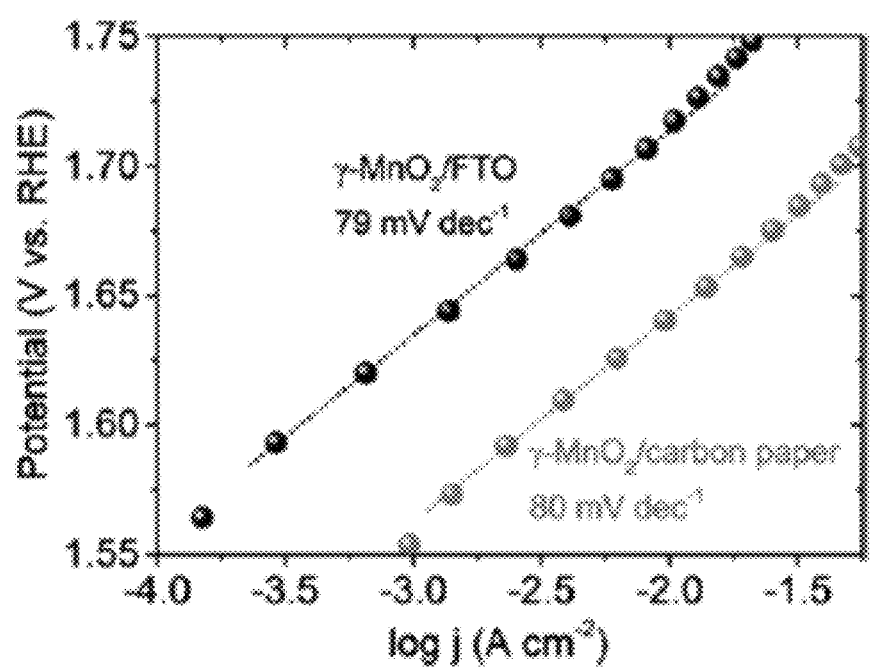
FIG. 2B is a diagram showing Tafel plots of γ-MnO$_2$ on FTO and carbon paper.
Figure 6A:
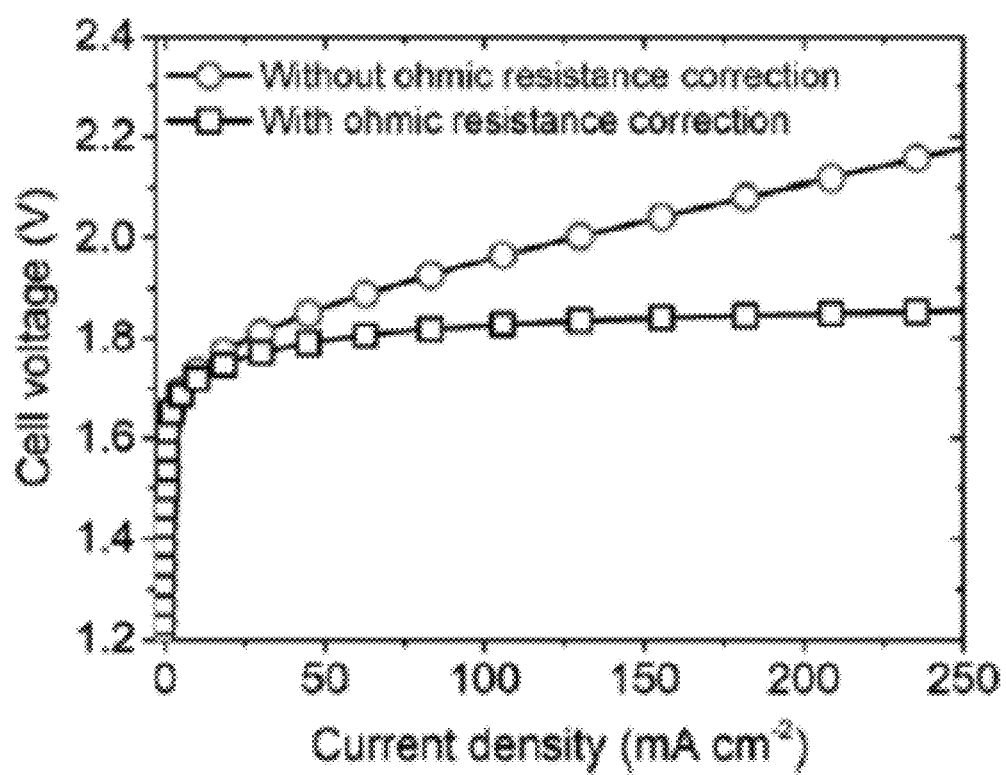
FIG. 6A is a diagram showing a linear sweep voltammogram of γ-MnO$_2$ on carbon paper at 25° C.
Figure 6B:
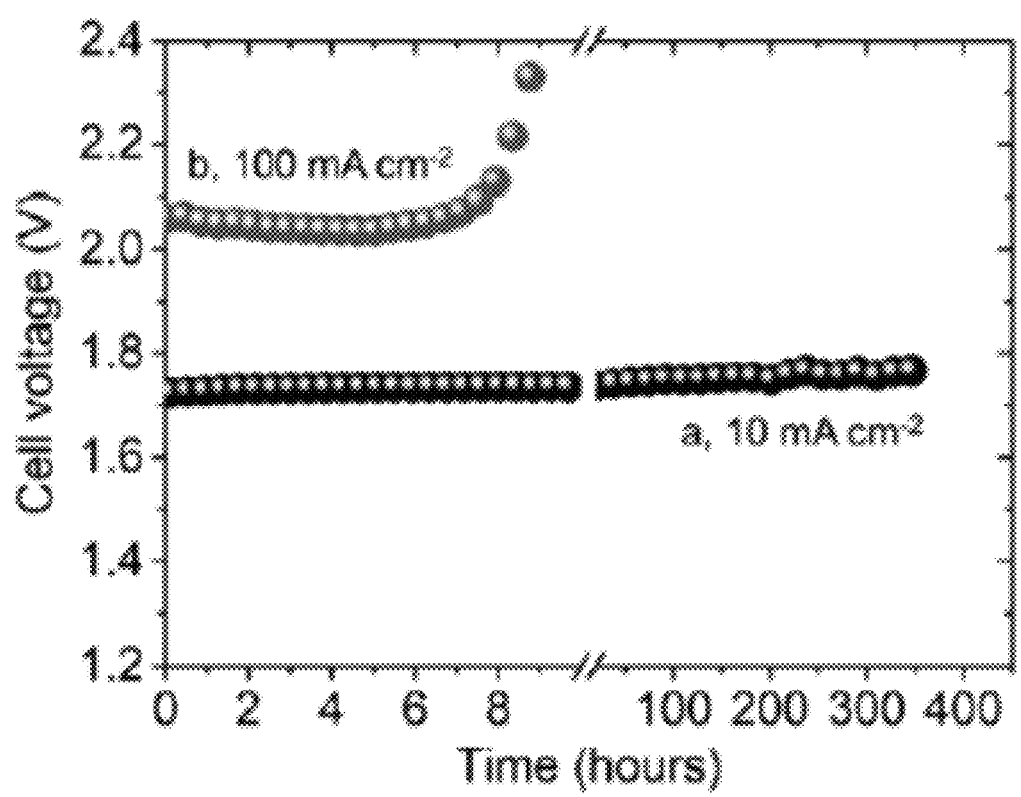
FIG. 6B is a graph showing the time dependence of cell voltage at 10 mAcm$^{-2}$ and 100 mAcm$^2$ (25° C., no ohmic resistance correction).

The merit of accurately measuring a stable potential window using spectroscopic technology is clearly shown in the results of PEM electrolysis (FIGS. 5A to 5C). This mechanism involves a two-electrode system with a Nafion layer in between, creating an acidic environment for the electrodes [see References 2c, 18]. Although it remains to optimize various factors such as cell resistance and catalyst loading, the current-voltage curve shown in FIG. 6A reveals the availability of γ-$MnO_2$ as an efficient OER catalyst in the PEM mechanism if the drive potential is within a stable potential window. The sum of the anode and cathode over-voltages during operation at a current density of 10 mAcm$^{-2}$ is about 480 mV at room temperature after ohmic correction, which is also consistent with the results of the 3-electrode system (FIG. 2A). The high stability of γ-$MnO_2$ is evident from the time dependence of the cell voltage during electrolysis at mAcm$^{-2}$, where the increase in operating voltage observed after 350 hours was only 30 mV (FIG. 6B, curve a). The average voltage efficiency over 350 hours of operation was 70.12%. Electrolysis at 100 mAcm$^{-2}$ led to an immediate decrease in voltage efficiency within 12 hours (FIG. 6B, curve b), demonstrating the importance of keeping γ-$MnO_2$ within the potential window in order to suppress its inactivation.

So far, it has been reported that only 4d/5d rare metals exhibit sufficient stability and act as catalysts for OER, but the present inventors here show how γ-$MnO_2$ can work continuously for more than 8000 hours under acidic conditions. On the other hand, they highlight why a small shift in drive potential of about 50-mV completely deactivates γ-$MnO_2$ within 120 hours, making it difficult to utilize $MnO_2$, which is abundant on the earth, as a stable OER catalyst in an acidic electrolyte. It has been reported that a state-of-the-art solar fuel generation system that combines an Ir-based PEM electrolyzer with a 3-junction photovoltaic (PV) cell produces an average solar-to-hydrogen (STH) conversion efficiency of over 30% [see Reference Document 2e], and therefore PV-electrically driven water electrolysis is one of the most viable means of producing renewable hydrogen. The present inventors expect that a spectroelectrochemical approach to identify a stable electrochemical window for OER in acids is a reasonable starting point for developing noble metal-free PEM systems for the production of renewable hydrogen.

Also in the oxidative decomposition system of water using other metals (such as iron, cobalt, and nickel) as a catalyst, the same manner as in the above embodiment makes it possible to determine the potential window (potential range) capable of stable driving depending on the properties of the solid polymer electrolyte membrane (such as anode side pH) to be combined as necessary.

Example 4

The cobalt-manganese oxide layer was formed on an FTO substrate (≤7 Ωsq$^{-1}$, manufactured by SPD Laboratory, Inc.) by variously changing the molar ratio of Co and Mn. Specifically, it is as follows.

<Production of FTO Electrode with $Co_2MnO_4$ Layer>

Co(NO$_3$)$_2$.6H$_2$O (JIS special grade, ≥98.0%, obtained from Fujifilm Wako Pure Chemical Corporation) and Mn(NO$_3$)$_2$.6H$_2$O (JIS special grade, ≥98.0%, obtained from Sigma-Aldrich) were each dissolved in water at a molar ratio where Co:Mn was 2:1 to prepare a precursor solution having a total cation concentration of 2.5 M. Onto a clean FTO substrate, 25 μL of this precursor solution was dropped (hereinafter referred to as "drop casting step"), and calcined on a hot plate in the air for 12 hours (hereinafter referred to as "calculation step") to form a layer. This was rinsed with Milli-Q water (18.2 MΩcm at 25° C., obtained from Merck Millipore) and ultrasonically cleaned for 10 seconds to remove particles such as impurities lightly adhering to the surface (hereinafter referred to as "cleaning step"). The drop casting step, calcination step, and cleaning step were repeated again to form a layer completely covering the surface of the FTO substrate. Prior to measurement, the electrode substrate was dried in an oven at 40° C. for several hours.

It was confirmed by the following analysis that the obtained layer was composed of a spinel-type cobalt-manganese oxide having a Co/Mn molar ratio of 2:1 (hereinafter, this layer is referred to as "$Co_2MnO_4$ layer"). In this way, an FTO electrode with a $Co_2MnO_4$ layer was prepared.

The X-ray diffraction (XRD) pattern was measured for the layer formed above. The measurement conditions were Cu-Kα ray (λ=1.5418 Å) irradiation, an operating voltage of 40 kV, and a current of 200 mA. In addition, a fully automatic multipurpose X-ray diffractometer SmartLab (Rigaku Corporation) was used for the measurement. The measurement was performed at a scan rate of 0.5°/min, in the range of 10 to 80° (2θ), at every 0.01°, and at a scan rate of 0.5°/min. From the obtained XRD pattern, it was understood that the obtained cobalt-manganese oxide had formed a crystal system having a cubic spinel structure.

In addition, X-ray photoelectron spectroscopy (XPS) was measured on the prepared catalyst layer using a ULVAC-PHI spectroscopic analyzer (PHI 5000 Versa Probe II) equipped with an AlKα (1486.6 eV) irradiation device.

The XPS measurement results showed that both $Co^{2+}$ and $Co^{3+}$ were present and their average valence was about 2.5, and both $Mn^{3+}$ and $Mn^{4+}$ were present and their average valence was about 3.6. Generally, the chemical formula of a cobalt-manganese spinel oxide having a Co/Mn ratio of 2:1 is represented by $(Co^{2+})_{tet}(Mn^{x+}Co^{3+})_{oct}O_{4+\delta}$ (δ=0.1 to 0.4), where $Co^{2+}$ is present at the tetrahedral site, and $Mn^{x+}$ and $Co^{3+}$ are located at the octahedral site. According to the XPS measurement results, x was about 3.6 and δ was about 0.3, which was in agreement with the previously reported values of cobalt-manganese spinel oxide having a Co/Mn ratio of 2:1.

In addition, when the element mapping of the catalyst layer was carried out by the energy dispersive X-ray (EDX) spectroscope equipped with TEM (JEM-2100F), it was confirmed that it was uniformly present as $Co_2MnO_4$ nanoparticles.

Furthermore, it was confirmed by TEM images (using a field emission electron microscope (JSF-7800F; 5 kV scanning), 200 kV) that the primary particle size of $Co_2MnO_4$ was 10 to 15 nm.

<Preparation of FTO Electrode with $Co_{1.5}Mn_{1.5}O_4$ Layer, $CoMn_2O_4$ Layer, or $Co_{0.1}Mn_{0.9}O_4$ Layer>

A $Co_{1.5}Mn_{1.5}O_4$ layer, a $CoMn_2O_4$ layer, and a $Co_{0.1}Mn_{0.9}O_4$ layer were each formed on an FTO in the same manner as above except that precursor solutions were prepared by setting the molar ratios of Co and Mn to 1:1, 1:2, and 1:9, and each precursor solution was used. Here, it was confirmed in the same manner as the $Co_2MnO_4$ layer that the composite oxides in the layers were spinel-type cobalt-manganese composite oxides having Co—Mn molar ratios of 1:1, 1:2, and 1:9.

In this way, an FTO electrode with a $Co_{1.5}Mn_{1.5}O_4$ layer, an FTO electrode with a $CoMn_2O_4$ layer, and an FTO electrode with a $Co_{0.1}Mn_{0.9}O_4$ layer were prepared.

<Evaluation of Stability of OER Catalytic Ability Under Strong Acid>

The stability of the oxygen evolution reaction (OER) catalytic ability of each layer under strong acid was evaluated by performing chronopotentiometry measurement. Specifically, it is as follows.

Chronopotentiometry at a current density of 100 $mAcm^{-2}$ was measured for each layered FTO electrode prepared above under strongly acidic conditions ($H_2SO_4$ with pH=1). A commercially available 3-electrode potentiated stat (HZ-7000; manufactured by Hokuto Denko Corporation) was used for the measurement. The counter electrode used was a Pt wire electrode (99.98%, PT-351325, Φ0.30 mm, manufactured by Nilaco), and the reference electrode used was Ag/AgCl (3.5 M KCl, manufactured by World Precision Instruments, 0.205V vs. NHE at 25° C.). The current density was calculated based on the area of the FTO substrate exposed to the electrolytic solution (0.28 $cm^2$). All measurements were performed at a temperature of 25° C.

Figure 7A:
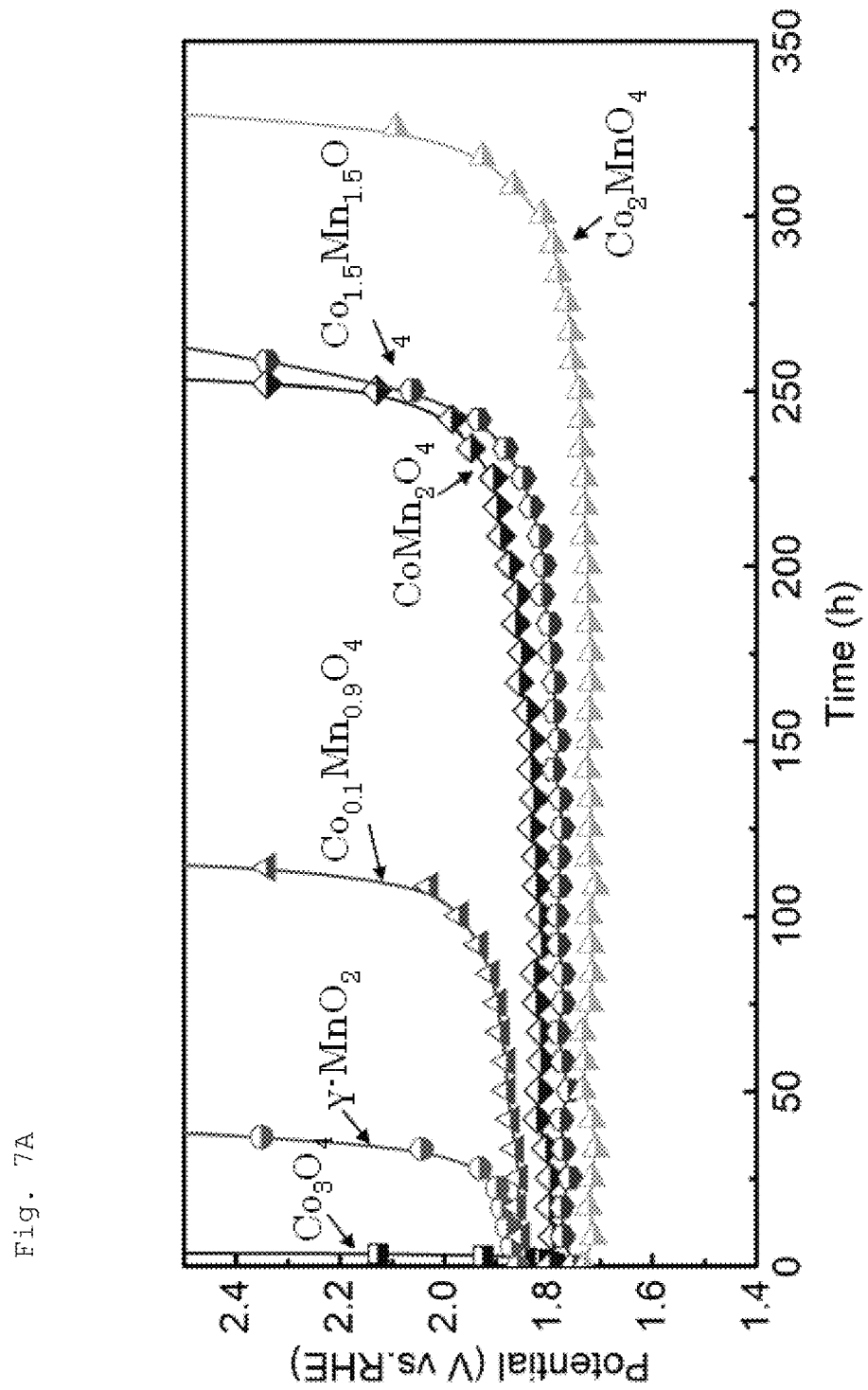
FIG. 7A is a graph showing the stability of spinel-type cobalt-manganese oxide Co$_{3-x}$MnXO$_4$ at pH 1 and 100 mAcm$^{-2}$.

Note that an FTO electrode with a $\gamma$-$MnO_2$ layer prepared in the same manner as described above (production of $\gamma$-$MnO_2$ on an FTO substrate), and an FTO electrode with $Co_3O_4$ prepared by a known method were also prepared, and chronopotentiometry was measured under the same conditions. FIG. 7A shows the results.

From the results shown in FIG. 7A, it can be understood that the use of the manganese oxide as a composite oxide of cobalt and manganese significantly improved the stability of the OER catalytic ability under strongly acidic conditions. This can be said to be an unpredictable result, considering that the catalytic ability of cobalt oxide was deactivated in a short time under strongly acidic conditions (see $Co_3O_4$ data).

Note that it is considered the steep deactivation of the catalytic ability of $\gamma$-$MnO_2$ was due to the fact that it was driven at a potential of 1.8 V outside the potential window where stable drive was possible. From this, it can be understood that the use of the cobalt manganese oxide as a composite of manganese oxide with cobalt makes it possible to expand the potential window capable of stable driving (specifically, raise the upper limit potential P2).

Figure 7B:
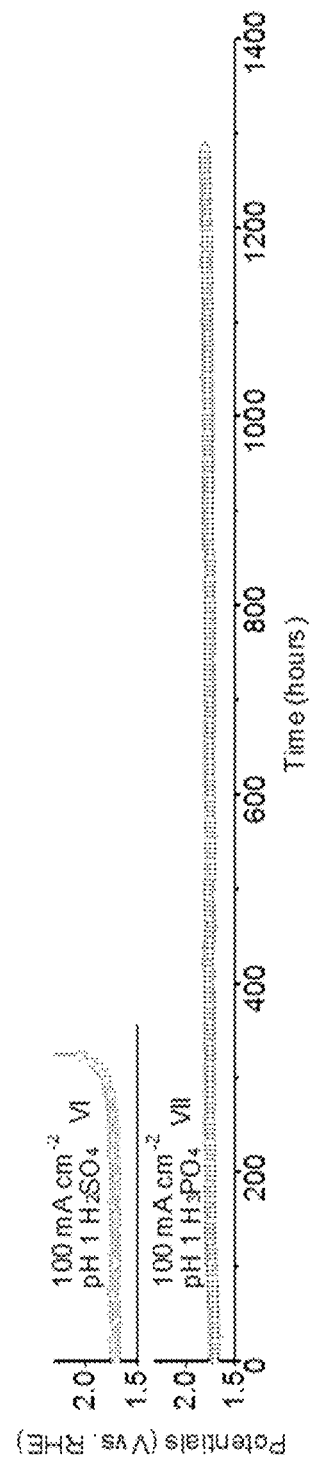
FIG. 7B is a graph showing the stability of Co$_2$MnO$_4$ for H$_2$SO$_4$ (pH 1) and H$_3$PO$_4$ (pH 1) at 100 mAcm$^{-2}$.

The chronopotentiometry was measured in the same manner for the FTO electrode with $Co_2MnO_4$ layer, which was found to have the highest stability under strongly acidic conditions, except that the electrolyzed water was changed from $H_2SO_4$ (pH=1) to $H_3PO_4$ (pH=1), and stable driving was possible for 1200 hours or more. FIG. 7B shows the results. Note that for reference, the curve of the FTO electrode with the $Co_2MnO_4$ layer extracted from FIG. 7A is shown together.

Figure 7C:
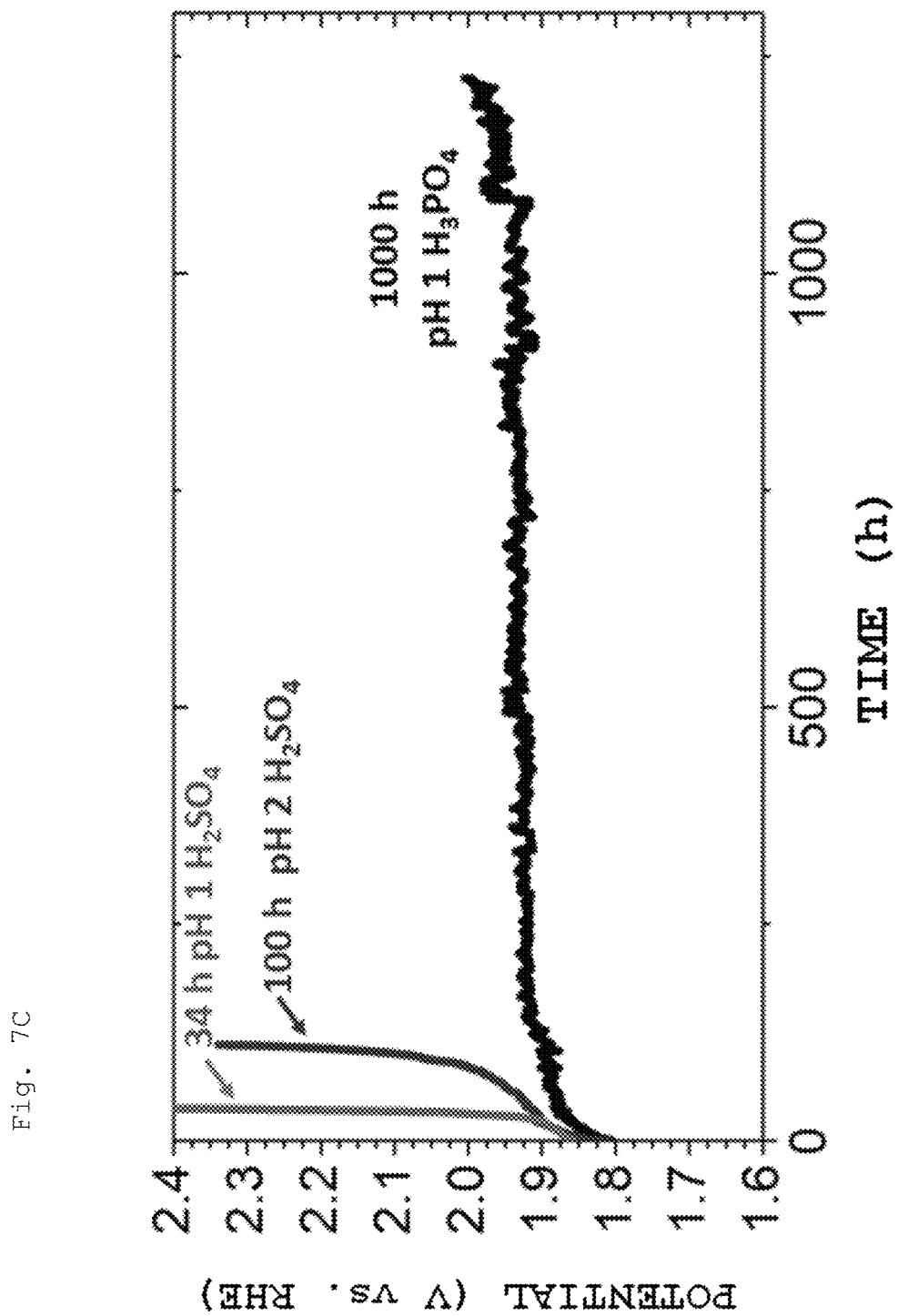
FIG. 7C is a graph showing the stability of γ-MnO$_2$ for H$_2$SO$_4$ (pH 1, pH 2) and H$_3$PO$_4$ (pH 1) at 100 mAcm$^{-2}$, and is a graph showing that the stability of γ-MnO$_2$ at 100 mAcm$^{-2}$ was significantly improved by using H$_3$PO$_4$ as an electrolyte.

In addition, in order to confirm the effect of electrolyzed water on stability, the chronopotentiometry was measured in the same manner also for the FTO electrode with $\gamma$-$MnO_2$ layer except that the electrolyzed water was changed from $H_2SO_4$ (pH=1) to $H_3PO_4$ (pH=1) and $H_2SO_4$ (pH=2). FIG. 7C shows the results. Note that for reference, the curve of the FTO electrode with the $\gamma$-$MnO_2$ layer extracted from FIG. 7A is shown together.

From the results of FIGS. 7B and 7C, it can be understood that the presence of phosphate ions in the electrolyzed water can also expand the stably-drivable potential window.

REFERENCE DOCUMENTS

[1]
a) R. E. Smalley, Bull. Mater. Res. Soc. 2005, 30, 412-417;
b) N. S. Lewis, D. G. Nocera, Proc. Natl. Acad. Sci. U.S.A. 2006, 103, 15729-15735;
c) N. Muradov, T. Veziroglu, Int. J. Hydrogen Energy 2008, 33, 68046839;
d) M. Gotz, J. Lefebvre, F. Mors, A. McDaniel Koch, F. Graf, S. Bajohr, R. Reimert, T. Kolb, Renew. Energy 2016, 85, 1371-1390;
e) B. Pivovar, N. Rustagi, S. Satyapal, Electrochem. Soc. Interface 2018, 27, 47-52.

[2]
a) J. A. Turner, Science 2004, 305, 972-974;
b) A. Ursua, L. M. Gandia, P. Sanchis, Proc. IEEE 2012, 100, 410-426;
c) M. Carmo, D. L. Fritz, J. Mergel, D. Stolten, Int. J. Hydrogen Energy 2013, 38, 4901-4934;
d) K. Fujii, S. Nakamura, M. Sugiyama, K. Watanabe, B. Bagheri, Y. Nakano, Int. J. Hydrogen Energy 2013, 38, 14424-14432;
e) J. Jia, L. C. Seitz, J. D. Benck, Y. Huo, Y. Chen, J. W. Ng, T. Bilir, J. S. Harris, T. F. Jaramillo, Nat. Commun. 2016, 7, 13237.
f) C. Tang, N. Cheng, Z. Pu, W. Xing, X. Sun, Angew. Chem. Int. Ed. 2015, 54, 9351-9355; Angew. Chem. 2015, 127, 9483-9487;
g) C. Tang, R. Zhang, W. Lu, L. He, X. Jiang, A. M. Asiri, X. Sun, Angew. Chem. Int. Ed. 2017, 56, 1064-1068; Angew. Chem. 2017, 129, 1084-1088;
h) G. Maayan, N. Gluz, G. Christou, Nat. Catal. 2018, 1, 48-54;
i) H. Liu, X. Gao, X. Yao, M. Chen, G. Zhou, J. Qi, X. Zhao, W. Wang, W. Zhang, R. Cao, Chem. Sci. 2019, 10, 191-197.

[3]
a) J. R. McKone, N. S. Lewis, H. B. Gray, Chem. Mater. 2014, 26, 407-414;
b) C. C. McCrory, S. Jung, I. M. Ferrer, S. M. Chatman, J. C. Peters, T. F. Jaramillo, J. Am. Chem. Soc. 2015, 137, 4347-4357;
c) L. C. Seitz, C. F. Dickens, K. Nishio, Y. Hikita, J. Montoya, A. Doyle, C. Kirk, A. Vojvodic, H. Y. Hwang, J. K. Norskov, T. F. Jaramillo, Science 2016, 353, 1011-1014;
d) S. Geiger, O. Kasian, M. Ledendecker, E. Pizzutilo, A. M. Mingers, W. T. Fu, O. Diaz-Morales, Z. Li, T. Oellers, L. Fruchter, A. Ludwig, K. J. J. Mayrhofer, M. T. M. Koper, S. Cherevko, Nat. Catal. 2018, 1, 508-515.
e) O. Kasian, J. -P. Grote, S. Geiger, S. Cherevko, K. J. J. Mayrhofer, Angew. Chem. Int. Ed. 2018, 57, 2488-2491; Angew. Chem. 2018, 130, 2514-2517.

[4] P. C. K. Vesborg, T. F. Jaramillo, RSC Adv. 2012, 2, 7933.

[5] E. A. Paoli, F. Masini, R. Frydendal, D. Deiana, C. Schlaup, M. Malizia, T. W. Hansen, S. Horch, I. E. L. Stephens, I. Chorkendorff, Chem. Sci. 2015, 6, 190-196.

[6]
a) I. Roger, M. A. Shipman, M. D. Symes, Nat. Rev. Chem. 2017, 1, 0003;
b) C. Spori, J. T. H. Kwan, A. Bonakdarpour, D. P. Wilkinson, P. Strasser, Angew. Chem. Int. Ed. 2017, 56, 5994-6021. Angew. Chem. 2017, 129, 6088-6117.

[7]
a) M. Pourbaix, Atlas of electrochemical equilibria in aqueous solutions, Pergamon, New York, 1966, pp. 286-292.
b) I. A. Moreno-Hernandez, C. A. MacFarland, C. G. Read, K. M. Papadantonakis, B. S. Brunschwig, N. S. Lewis, Energy Environ. Sci. 2017, 10, 2103-2108;
c) J. S. Mondschein, J. F. Callejas, C. G. Read, J. Y. C. Chen, C. F. Holder, C. K. Badding, R. E. Schaak, Chem. Mater. 2017, 29, 950-957;
d) R. Frydendal, E. A. Paoli, I. Chorkendorff, J. Rossmeisl, I. E. L. Stephens, Adv. Energy Mater. 2015, 5, 1500991;
e) M. Huynh, T. Ozel, C. Liu, E. C. Lau, D. G. Nocera, Chem. Sci. 2017, 8, 4779-4794;
f) R. Pokhrel, M. K. Goetz, S. E. Shaner, X. Wu, S. S. Stahl, J. Am. Chem. Soc. 2015, 137, 8384-8387;
g) M. Blasco-Ahicart, J. Soriano-Lopez, J. J. Carbo, J. M. Poblet, J. R. Galan-Mascaros, Nat. Chem. 2018, 10, 24-30.

[8]
J. K. Norskov, T. Bligaard, J. Rossmeisl, C. H. Christensen, Nat. Chem. 2009, 1, 37-46.

[9]
a) S. Bodoardo, J. Brenet, M. Maja, P. Spinelli, Electrochim. Acta 1994, 39, 1999-2004;
b) Y. Chabre, J. Pannetier, Prog. Solid State Chem. 1995, 23, 1-130;
c) D. K. Walanda, G. A. Lawrance, S. W. Donne, J. Power Sources 2005, 139, 325-341.

[10]
a) P. M. de Wolff, Acta Crystallogr. 1959, 12, 341-345;
b) S. Turner, P. R. Buseck, Nature 1983, 304, 143146.

[11] C. Julien, M. Massot, S. Rangan, M. Lemal, D. Guyomard, J. Raman Spectrosc. 2002, 33, 223-228.

[12]
a) M. Huynh, D. K. Bediako, D. G. Nocera, J. Am. Chem. Soc. 2014, 136, 6002-6010;
b) M. Huynh, C. Shi, S. J. Billinge, D. G. Nocera, J. Am. Chem. Soc. 2015, 137, 14887-14904;
c) L. Han, P. Tang, A. ReyesCarmona, B. Rodriguez-Garcia, M. Torrens, J. R. Morante, J. Arbiol, J. R. Galan-Mascaros, J. Am. Chem. Soc. 2016, 138, 16037-16045;
d) M. Blasco-Ahicart, J. Soriano-Lopez, J. J. Carbo, J. M. Poblet, J. R. GalanMascaros, Nature chemistry 2018, 10, 24-30.

[13]
a) T. Takashima, K. Hashimoto, R. Nakamura, J. Am. Chem. Soc. 2012, 134, 1519-1527;
b) K. Jin, H. Seo, T. Hayashi, M. Balamurugan, D. Jeong, Y. K. Go, J. S. Hong, K. H. Cho, H. Kakizaki, N. Bonnet-Mercier, M. G. Kim, S. H. Kim, R. Nakamura, K. T. Nam, J. Am. Chem. Soc. 2017, 139, 2277-2285.

[14]
G. Davies, Coord. Chem. Rev. 1969, 4, 199-224.

[15]
N. V. Klassen, D. Marchington, H. C. E. McGowan, Anal. Chem. 1994, 66, 2921-2925.

[16]
a) C. H. Kuo, W. Li, L. Pahalagedara, A. M. El-Sawy, D. Kriz, N. Genz, C. Guild, T. Ressler, S. L. Suib, J. He, Angew. Chem., Int. Ed. 2015, 54, 2345-2350;
b) I. Zaharieva, P. Chernev, M. Risch, K. Klingan, M. Kohlhoff, A. Fischer, H. Dau, Energy Environ. Sci. 2012, 5, 7081;
c) B. Zhang, H. Chen, Q. Daniel, B. Philippe, F. Yu, M. Valvo, Y. Li, R. B. Ambre, P. Zhang, F. Li, H. Rensmo, L. Sun, ACS Catal. 2017, 7, 6311-6322.

[17]
a) A. J. Bard, R. Parsons, J. Jordan, Standard Potentials in Aqueous Solution, CRC Press, New York, 1985, pp. 429-439.
b) J. M. Dick, Geochem. Trans., 2008, 9, 10.

[18]
N. F. Bunkin, P. S. Ignatiev, V. A. Kozlov, A. V. Shkirin, S. D. Zakharov, A. A. Zinchenko, Water 2013, 4, 129-154.

[19]
M. Maneva, N. Petroff, J. Therm. nal. 1990, 36, 2511-2520.

[20]
S. Brunauer, P. H. Emmett, E. Teller, J. Am. Chem. Soc. 1938, 60, 309-319.

[21]
E. P. Barrett, L. G. Joyner, P. P. Halenda, J. Am. Chem. Soc. 1951, 73, 373-380.

[22]
K. Zeng, D. Zhang, Pror. Energy Combust. Sci. 2010, 36, 307-326.

[23]
a) T. Takashima, K. Hashimoto, R. Nakamura, J. Am. Chem. Soc. 2012, 134, 18153-18156;
b) Y. Gorlin, B. Lassalle-Kaiser, J. D. Benck, S. Gul, S. M. Webb, V. K. Yachandra, J. Yano, T. F. Jaramillo, J. Am. Chem. Soc. 2013, 135, 8525-8534;
c) Z. Morgan Chan, D. A. Kitchaev, J. Nelson Weker, C. Schnedermann, K. Lim, G. Ceder, W. Tumas, M. F. Toney, D. G. Nocera, Proc. Natl. Acad. Sci. U.S.A 2018, 115, E5261E5268.

[24]
G. Mattioli, I. Zaharieva, H. Dau, L. Guidoni, J. Am. Chem. Soc. 2015, 137, 10254-10267.

[25]
O. Schilling, J. R. Dahn, J. Appl. Crystallogr. 1998, 31, 396-406.

[26]
J. E. Post, Proc. Natl. Acad. Sci. U.S.A 1999, 96, 3447-3454.

[27]
W. H. Baur, Acta Crystallogr., Sect. B:Struct. Crystallogr. Cryst. Chem. 1976, 32, 2200-2204.

[28]
J. E. Post, P. J. Heaney, Am. Mineral. 2004, 89, 969-975.

[29]
a) E. Silvester, A. Manceau, V. A. Drits, Am. Mineral. 1997, 82, 962-978;
b) Y. Tanaka, M. Tsuji, Y. Tamaura, Phys. Chem. Chem. Phys. 2000, 2, 1473-1479; c) S. Tu, G. J. Racz, T. B. Goh, Clays Clay Miner. 1994, 42, 321-330.

[30]
a) J. S. Mondschein, et al., Inorg. Chem. 2018, 57, 6010-6015.
b) Delgado et al. Sci. Rep. 2015, 5, 15208.

[31]
J. G. Vos, T. A. Wezendonk, A. W. Jeremiasse, M. T. M. Koper, J. Am. Chem. Soc., 2018, 140, 10270-10281

INDUSTRIAL APPLICABILITY

As described above, according to the present invention, an oxidation catalyst containing a first transition metal can stably electrolyze water.

The invention claimed is:
1. A water electrolysis method comprising:
supplying at least water into an electrolysis cell which includes a solid polymer electrolyte membrane, and an anode and a cathode disposed sandwiching the solid polymer electrolyte membrane therebetween; and providing a potential P between the anode and the cathode to generate oxygen from the anode, wherein
  an oxidation catalyst containing at least one of first transition metals is present on at least a part of a surface of the anode, and
  the potential P satisfies P1<P<P2,
    wherein P1 indicates a lowest potential at which oxygen is generated from the anode, and P2 indicates a lowest potential P2 at which a quantitative index of a dissolved chemical species derived from the oxidation catalyst begins to show potential dependence, and
wherein said method further comprises, before providing said potential P between the anode and the cathode, determining said drive potential P by comparing a first curve and a second curve, the first curve having been formed by plotting the amount of oxygen evolution from the anode against a potential between the anode and the cathode, and the second curve having been formed by plotting a quantitative index of a dissolved chemical species derived from the oxidation catalyst against the potential between the anode and the cathode.

2. The method according to claim 1, wherein the quantitative index is an intensity I of an absorption peak attributed to the chemical species.

3. The method according to claim 1, wherein the first transition metal is at least one metal selected from manganese, iron, cobalt, and nickel.

4. The method according to claim 1, wherein the oxidation catalyst is an oxide or hydroxide of at least one selected from the first transition metals.

5. The method according to claim 1, wherein the oxidation catalyst is at least one metal oxide or metal hydroxide selected from manganese oxide (2+, 3+, 4+), iron oxide (2+, 3+), cobalt hydroxide (2+, 3+), and nickel oxide (2+, 3+, 4+).

6. A water electrolysis method comprising:
  supplying at least water into an electrolysis cell which includes a solid polymer electrolyte membrane, and an anode and a cathode disposed sandwiching the solid polymer electrolyte membrane therebetween; and
  providing a potential P between the anode and the cathode to generate oxygen from the anode,
  wherein an oxidation catalyst is present on at least a part of a surface of the anode, wherein the oxidation catalyst is manganese oxide,
  wherein the potential P satisfies P1<P<P2, in which P1 indicates a lowest potential at which oxygen is generated from the anode, and P2 indicates a lowest potential P2 at which a quantitative index of a dissolved chemical species derived from the oxidation catalyst begins to show potential dependence, and
  wherein P satisfies 1.65 V<P<1.75 V with respect to a hydrogen electrode (RHE).

* * * * *